(12) United States Patent
Iwai et al.

(10) Patent No.: US 8,711,814 B2
(45) Date of Patent: Apr. 29, 2014

(54) RADIO COMMUNICATION DEVICE AND SEQUENCE LENGTH ADJUSTING METHOD

(75) Inventors: Takashi Iwai, Ishikawa (JP); Tomofumi Takata, Ishikawa (JP); Daichi Imamura, Kanagawa (JP); Yoshihiko Ogawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 387 days.

(21) Appl. No.: 12/679,660

(22) PCT Filed: Sep. 26, 2008

(86) PCT No.: PCT/JP2008/002697
§ 371 (c)(1),
(2), (4) Date: Mar. 23, 2010

(87) PCT Pub. No.: WO2009/041066
PCT Pub. Date: Apr. 2, 2009

(65) Prior Publication Data
US 2010/0195637 A1    Aug. 5, 2010

(30) Foreign Application Priority Data
Sep. 28, 2007    (JP) .................................. 2007-255414

(51) Int. Cl.
*H04B 1/707* (2011.01)

(52) U.S. Cl.
USPC ........... 370/335; 370/310; 370/350; 370/329; 370/260; 370/328

(58) Field of Classification Search
USPC ......................................... 370/310–350, 479
See application file for complete search history.

(56) References Cited

U.S. PATENT DOCUMENTS

| | | | |
|---|---|---|---|
| 2005/0226140 A1* | 10/2005 | Zhuang et al. | 370/203 |
| 2008/0232486 A1* | 9/2008 | Kowalski | 375/260 |
| 2009/0325513 A1 | 12/2009 | Iwai | |

FOREIGN PATENT DOCUMENTS

| | | |
|---|---|---|
| CN | 1934812 | 3/2007 |
| WO | 2008/044629 | 4/2008 |

OTHER PUBLICATIONS

International Search Report dated Dec. 2, 2008.
3GPP TS 36.211 v1.2.0, "Physical Channels and Modulation," Jun. 2007, 43 pages.
3GPP TSG RAN WG1 #47bis Meeting, "Structure of uplink reference signal," Fujitsu, R1-070365, Jan. 2007, pp. 1-7.
3GPP TSG RAN WG1#48bis, "Optimized UL RS Design—OZCL Sequences," Sharp, R1-072053, May 2007, pp. 1-23.
3GPP TSG RAN WG1 #48bis, "Selection between Truncation and Cyclic Extension for UL RS Generation," Motorola, R1-071339, Mar. 2007, pp. 1-6.
3GPP RAN WG1 Meeting #48, "Criteria to decide Zadoff-Chu sequence length for EUTRA uplink reference signal," NEC Group, R1-070877, Feb. 2007, 4 pages.
Chinese Office Action dated Jun. 1, 2012.

\* cited by examiner

*Primary Examiner* — Charles C Jiang
*Assistant Examiner* — Jamal Javaid
(74) *Attorney, Agent, or Firm* — Dickinson Wright PLLC

(57) ABSTRACT

Provided is a radio communication device which can prevent generation of mutual correlation peak between ZC sequences and reduce degradation of BLER characteristic of a CS-ZC sequence. In this device, a sequence length adjustment unit (103) truncates or extends the ZC sequence while maintaining the symmetry of the ZC sequence inputted from a ZC sequence generation unit (102) so as to adjust the sequence length to the number of subcarriers equivalent to the transmission bandwidth of a reference signal inputted from a sequence length setting unit (101). More specifically, the sequence length adjustment unit (103) truncates or extends any one of symbols constituting the ZC sequence so as to truncate or extend the ZC sequence. A transmission RF unit (107) transmits the ZC sequence after the sequence length adjustment.

8 Claims, 28 Drawing Sheets

RADIO COMMUNICATION DEVICE AND SEQUENCE LENGTH ADJUSTING METHOD

TECHNICAL FIELD

The present invention relates to a radio communication apparatus and a sequence length adjusting method.

BACKGROUND ART

A mobile communication system uses a reference signal (RS) for channel estimation, channel quality estimation, measurement of a reception level for controlling transmission power and so forth. 3GPP LTE (3rd Generation Partnership Project Long Term Evolution) adopts a Zadoff-Chu (ZC) sequence as RS used for an uplink and a downlink. The ZC sequence is adopted as RS because its frequency characteristic is uniform and its auto-correlation characteristic and cross-correlation characteristic are excellent. The ZC sequence is a kind of a GCL (Generalized Chirp-Like) sequence and is expressed by following equation 1.

(Equation 1)

$$x_u(n) = e^{-j\frac{\pi u\{n(n+1)+qn\}}{N_{ZC}}}, \quad [1]$$
$$0 \le n \le N_{ZC} - 1$$

In equation 1, $N_{ZC}$ is the sequence length of the ZC sequence, u is the ZC sequence number, and $N_{ZC}$ and u are integers, which are "prime" to one another. Furthermore, n is the symbol number of the ZC sequence and q is an arbitrary integer. Furthermore, 3GPP LTE is studying use of a ZC sequence expressed by equation 2, which assumes q=0 in equation 1.

(Equation 2)

$$x_u(n) = e^{-j\frac{\pi u n(n+1)}{N_{ZC}}}, \quad [2]$$
$$0 \le n \le N_{ZC} - 1$$

Furthermore, the ZC sequence allows $N_{ZC}-1$ quasi-orthogonal sequences with excellent cross-correlation characteristics to be generated from the ZC sequence whose sequence length $N_{ZC}$ is a prime number.

Furthermore, RS used on an uplink according to 3GPP LTE is transmitted in a transmission bandwidth of an integer multiple of 1 RB (Resource Block) composed of 12 subcarriers (e.g., see Non-Patent Document 1). Thus, the sequence length of the ZC sequence, which is a prime number, does not match the number of subcarriers, which corresponds to the transmission bandwidth of RS. For example, for RS transmitted with 1 RB (12 subcarriers), a ZC sequence whose sequence length $N_{ZC}$ is 11 or 13 is used, and for RS transmitted with 2 RBs (24 subcarriers), a ZC sequence whose sequence length $N_{ZC}$ is 23 or 29 is used.

Here, as the method of obtaining a ZC sequence having a sequence length corresponding to the number of subcarriers equivalent to the transmission bandwidth of RS, two methods are under study; "truncation" that deletes part of the ZC sequence and "extension" that extends part of the ZC sequence (e.g., see Patent Document 1). Of symbols constituting the ZC sequence whose sequence length is greater than the number of subcarriers equivalent to the transmission bandwidth of RS, "truncation" deletes symbols corresponding to the portion that exceeds the number of subcarriers. On the other hand, "extension" extends by adding symbols corresponding to the shortage relative to the number of subcarriers to symbols constituting the ZC sequence whose sequence length is smaller than the number of subcarriers corresponding to the transmission bandwidth of RS. When, for example, a ZC sequence whose sequence length N is 13 is used, RS of 12 symbols is generated by truncating the ZC sequence, that is, by deleting the last one symbol of the ZC sequence. On the other hand, when a ZC sequence whose sequence length N is 11 is used, RS of 12 symbols is generated by extending the ZC sequence, that is, by adding a copy of the first one symbol of the ZC sequence to the end thereof (e.g., see Non-Patent Document 2).

Furthermore, 3GPP LTE is also studying use of a CS (Cyclic-Shifted)-ZC sequence, which is a cyclically shifted ZC sequence obtained by truncation or extension as RS. The CS-ZC sequence is a sequence generated by making one ZC sequence cyclically shift by an amount of cyclic shift, which differs from one cell to another or from one radio communication apparatus on a transmitting side to another. The radio communication apparatus in the receiving side performs correlation operation of the received RS, detects each RS within a detection range preset for each cell according to the amount of cyclic shift and thereby separates different cells or different mobile units. Unless a propagation delay time of a radio transmission terminal exceeds the amount of shift, cross-correlation between sequences becomes 0 and the CS-ZC sequences are orthogonal to each other, and therefore using the CS-ZC sequence as RS increases the detection accuracy of RS.

Patent Document 1: US Patent Application Laid-Open No. 2005/0226140 Specification Non-Patent Document 1: TS36.211 v1.2.0, "3GPP TSG RAN; Physical Channels and Modulation (Release 8)"

Non-Patent Document 2: Fujitsu, R1-070365, "Structure of uplink reference signal", 3GPP TSG RAN WG1 #47bis Meeting, Sorrento, Italy, Jan. 15-19, 2007

DISCLOSURE OF INVENTION

Problems to be Solved by the Invention

However, the above described prior art has a problem that the cross-correlation characteristic between CS-ZC sequences generated from the ZC sequence is not flat and therefore a BLER (BLock Error Ratio) performance degrades. Particularly, the BLER performance of a CS-ZC sequence in which a cross-correlation peak occurs within the detection range degrades more than other CS-ZC sequences.

Here, FIG. 1 shows a result of the BLER performance obtained through computer simulation by the present inventors. Here, a symbol located at the end of a ZC sequence having sequence length $N_{ZC}=13$ is truncated to generate a ZC sequence of 12 symbols. Furthermore, six CS-ZC sequences (CS-ZC sequences #1 to 6) are generated by cyclically shifting the generated ZC sequence of 12 symbols by the different amount of cyclic shift. Each CS-ZC sequence is used as RS of a different radio communication apparatus in the transmitting side and a radio communication apparatus in the receiving side performs channel estimation based on the RS and demodulates a data signal.

It is observed from FIG. 1 that the BLER performance of CS-ZC sequence #1 is the best, whereas the BLER performance of CS-ZC sequence #4 is the worst. Furthermore, it is also observed that with regard to a required Es/No that satisfies BLER=0.1 (10%), there is a difference of approximately 1 dB between CS-ZC sequence #1 and CS-ZC sequence #4.

Thus, when a plurality of CS-ZC sequences generated from a truncated or extended ZC sequence is used as RS, the BLER performance of each CS-ZC sequence degrades.

The present invention has been made in view of the above described problems, and it is therefore an object of the present invention to provide a radio communication apparatus and a sequence length adjusting method being capable of preventing any cross-correlation peak from occurring between ZC sequences and reducing degradation of a BLER performance of a CS-ZC sequence.

Means for Solving the Problem

The radio communication apparatus according to the present invention adopts a configuration including an adjusting section that adjusts a sequence length of a generalized chirp-like sequence by truncating or extending a generalized chirp-like sequence while maintaining symmetry of the generalized chirp-like sequence; and a transmitting section that transmits the Generalized chirp-like sequence after the sequence length is adjusted.

Advantageous Effects of Invention

It is an object of the present invention to prevent cross-correlation peaks from occurring between ZC sequences and reduce degradation of a BLER performance of a CS-ZC sequence.

BEST MODE FOR CARRYING OUT THE INVENTION

Figure 2:
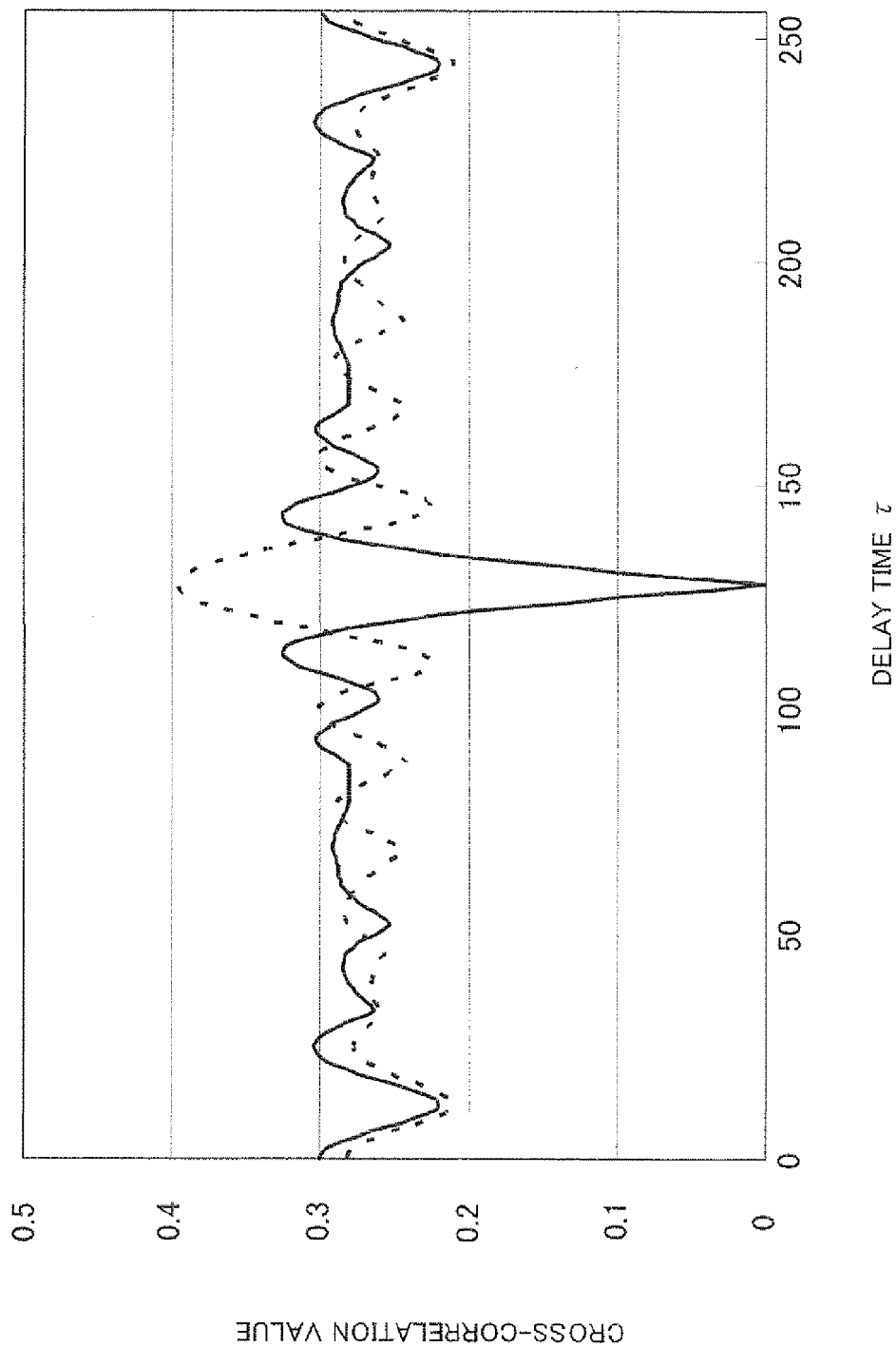
FIG. 2 is a diagram illustrating a cross-correlation characteristic among CS-ZC sequences when the last symbol of the ZC sequence is truncated.

FIG. 2 shows a cross-correlation characteristic between ZC sequences having different sequence numbers obtained through computer simulation by the present inventors. Here, suppose sequence length $N_{ZC}=13$ in equation 2. Furthermore, FIG. 2 shows the cross-correlation characteristic (dotted line) of a ZC sequence having 12 subcarriers obtained by truncating the symbol number n=12 located at the end of the ZC sequence (symbol number n=0 to 12) and the cross-correlation characteristic (solid line) of a ZC sequence having 12 subcarriers obtained by truncating the symbol number n=6 located in the center of the ZC sequence. In FIG. 2, the horizontal axis shows a delay time τ of a reception timing and the vertical axis shows an average value of cross-correlation values by all combinations of sequence numbers of the ZC sequence. As shown in FIG. 2, with the cross-correlation characteristic between the ZC sequences obtained by truncating the symbol number n=12, a cross-correlation peak occurs in the vicinity of a delay time=128. On the other hand, it is observed that with the cross-correlation characteristic in the ZC sequence obtained by truncating the symbol number n=6, no cross-correlation peak occurs in the vicinity of the delay time=128 and the lowest cross-correlation value is marked in the entire delay time range. When the ZC sequence is truncated in this way, the cross-correlation characteristic differs depending on the position of each symbol truncated.

Figure 3:
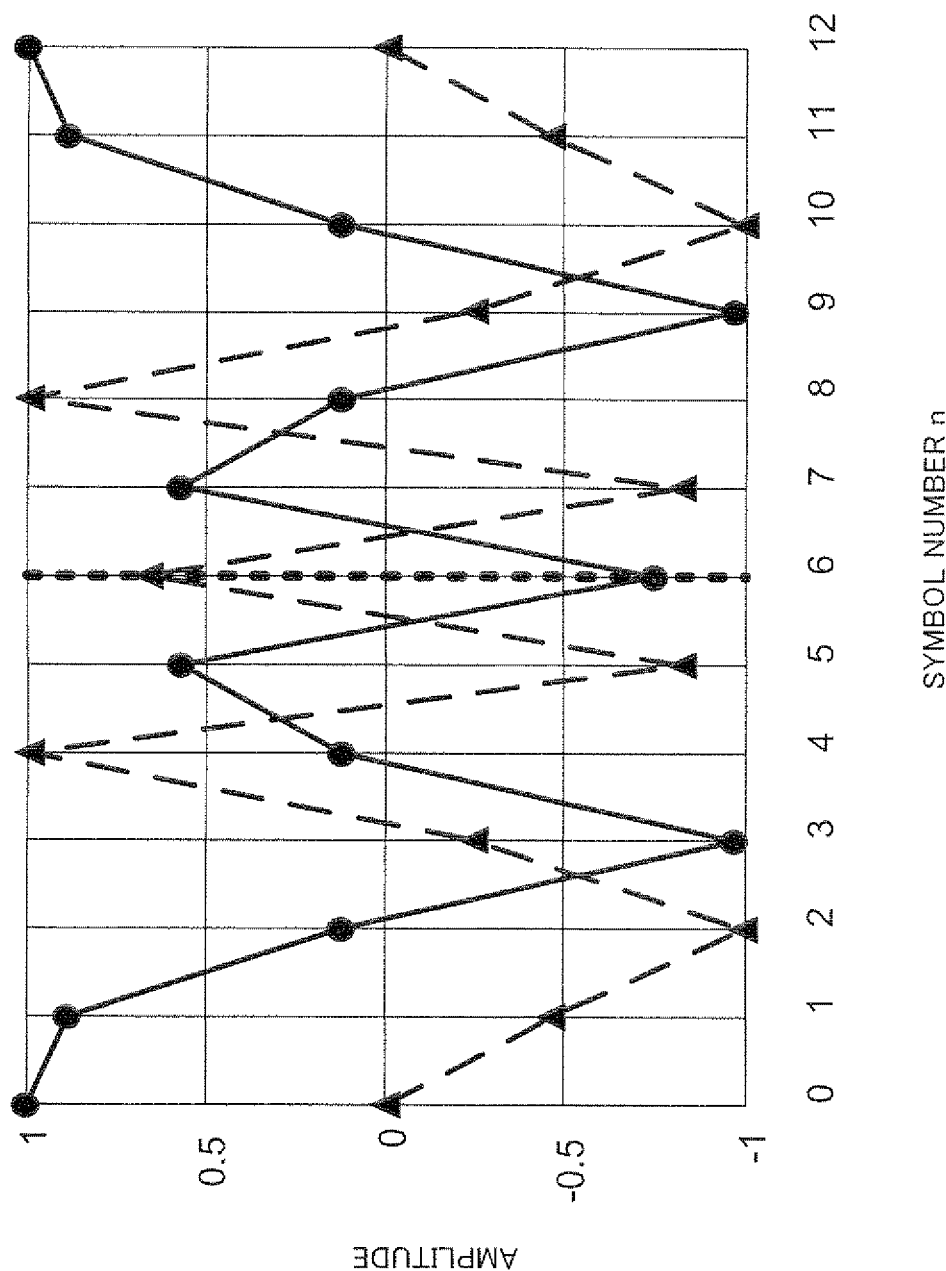
FIG. 3 is a diagram illustrating a waveform of a ZC sequence.

Next, FIG. 3 illustrates a waveform of a ZC sequence obtained through computer simulation by the present inventors. Here, suppose sequence length $N_{ZC}$ is 13 in equation 2 as with the case of the computer simulation shown in FIG. 2. In addition, FIG. 3 shows a waveform (real part component: solid line, imaginary part component: dotted line) of a ZC sequence (symbol numbers n=0 to 12) having sequence number u=1. It is observed from FIG. 3 that the waveform of the ZC sequence is a waveform even-symmetrical centered around the symbol number n=6 located in the center of the ZC sequence in both the real part component and the imaginary part component. That is, in FIG. 3, the amplitude of the symbol of the symbol number n=0 is the same as the amplitude of the symbol of the symbol number n=12, and the amplitude of the symbol of the symbol number n=1 is the same as the amplitude of the symbol of the symbol number n=11. In the same way, the amplitudes of the symbols of the symbol numbers n=2 to 5 are the same as the amplitudes of the symbols of the symbol numbers n=10 to 7 respectively.

Here, when the cross-correlation peak occurs as shown in FIG. 2, that is, when the symbol of the symbol number n=12 is truncated, the waveform of the ZC sequence corresponds to the waveform of the ZC sequence shown in FIG. 3 without the symbol of the symbol number n=12. That is, there is no longer the symmetrical relationship between the symbol of the symbol number n=12 and the symbol of the symbol number n=0 as shown in FIG. 3. This causes the symmetry of the whole ZC sequence after truncation to be lost. On the other hand, when no cross-correlation peak occurs as shown in FIG. 2, that is, when the symbol of the symbol number n=6 is truncated, the waveform of the ZC sequence corresponds to the waveform of the ZC sequence shown in FIG. 3 without the symbol of the symbol number n=6. Here, as shown in FIG. 3, since the symbol of the symbol number n=6 is not symmetrical with any other symbols, the symmetry of the ZC sequence after truncation is maintained.

That is, when the ZC sequence is truncated or extended, if the symmetry of the whole ZC sequence is maintained, it is possible to prevent any cross-correlation peak from occurring in the cross-correlation characteristic between ZC sequences of different sequence numbers. That is, it is possible to maintain an excellent cross-correlation characteristic of the ZC sequences.

Therefore, the ZC sequence is truncated or extended while maintaining symmetry between symbols constituting the ZC sequence in the present invention.

Now, embodiments of the present invention will be described in detail with reference to the accompanying drawings.

Embodiment 1

Figure 4:
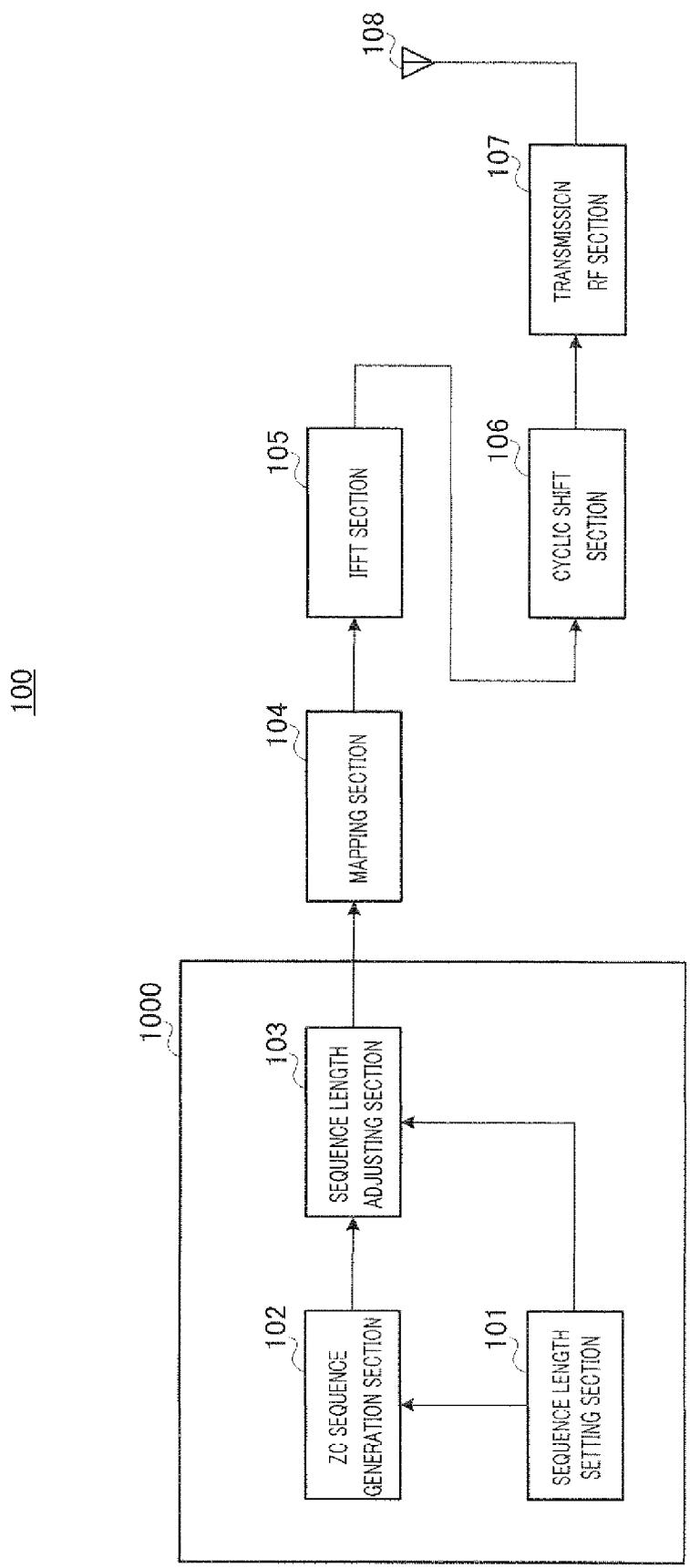
FIG. 4 is a block diagram illustrating a configuration of a radio communication apparatus in the transmitting side according to embodiment 1 of the present invention.

FIG. 4 is a block diagram illustrating a configuration of radio communication apparatus 100 in the transmitting side according to the present embodiment.

ZC sequence generation section 1000 provided in radio communication apparatus 100 in the transmitting side in FIG. 4 is similar to ZC sequence generation section 207 provided in radio communication apparatus 200 in the receiving side (described later in FIG. 5) and has sequence length setting section 101, ZC sequence generation section 102 and sequence length adjusting section 103. ZC sequence generation section 1000 generates a ZC sequence truncated or extended based on sequence length $N_{ZC}$ of the ZC sequence and the number of subcarriers $N_{RB}$ corresponding to the transmission bandwidth of RS and outputs the resulting ZC sequence to mapping section 104.

Sequence length setting section 101 outputs the sequence length $N_{ZC}$ of the ZC sequence to ZC sequence generation section 102 and outputs the number of subcarriers $N_{RB}$ corresponding to the transmission bandwidth of RS to sequence length adjusting section 103.

ZC sequence generation section 102 generates a ZC sequence using the sequence length $N_{ZC}$ inputted from sequence length setting section 101 according to equation 1 or equation 2 and outputs the generated ZC sequence to sequence length adjusting section 103.

Sequence length adjusting section 103 adjusts the sequence length to the number of subcarriers $N_{RB}$ inputted from sequence length setting section 101 by truncating or extending the ZC sequence while maintaining symmetry of the ZC sequence inputted from ZC sequence generation section 102. To be more specific, sequence length adjusting section 103 truncates or extends the ZC sequence by truncating or extending one of a plurality of symbols constituting a ZC sequence. Here, sequence length adjusting section 103 truncates, when $N_{ZC}$ is greater than $N_{RB}$, the ZC sequence inputted from ZC sequence generation section 102 and extends, when $N_{ZC}$ is smaller than $N_{RB}$, the ZC sequence inputted from ZC sequence generation section 102. Sequence length adjusting section 103 then outputs the ZC sequence of the adjusted sequence length $N_{RB}$ to mapping section 104. Details of the sequence length adjusting processing in sequence length adjusting section 103 will be described later.

Mapping section 104 maps the ZC sequence having the adjusted sequence length inputted from sequence length adjusting section 103 of ZC sequence generation section 1000 to a resource block corresponding to the transmission band of RS and outputs the mapped ZC sequence to IFFT (Inverse Fast Fourier Transform) section 105.

IFFT section 105 applies IFFT processing to the ZC sequence inputted from mapping section 104 and outputs the ZC sequence to which the IFFT processing has been applied to cyclic shift section 106.

Cyclic shift section 106 applies cyclic shift of a predetermined time length set for radio communication apparatus 100 to the ZC sequence inputted from IFFT section 105 and outputs the ZC sequence to which the cyclic shift has been applied, that is, the CS-ZC sequence, to transmission RF section 107.

Transmission RF section 107 applies transmission processing such as D/A conversion, up-conversion, and amplification to the ZC sequence inputted from cyclic shift section 106 and transmits the signal to which the transmission processing has been applied via antenna 108.

Figure 5:
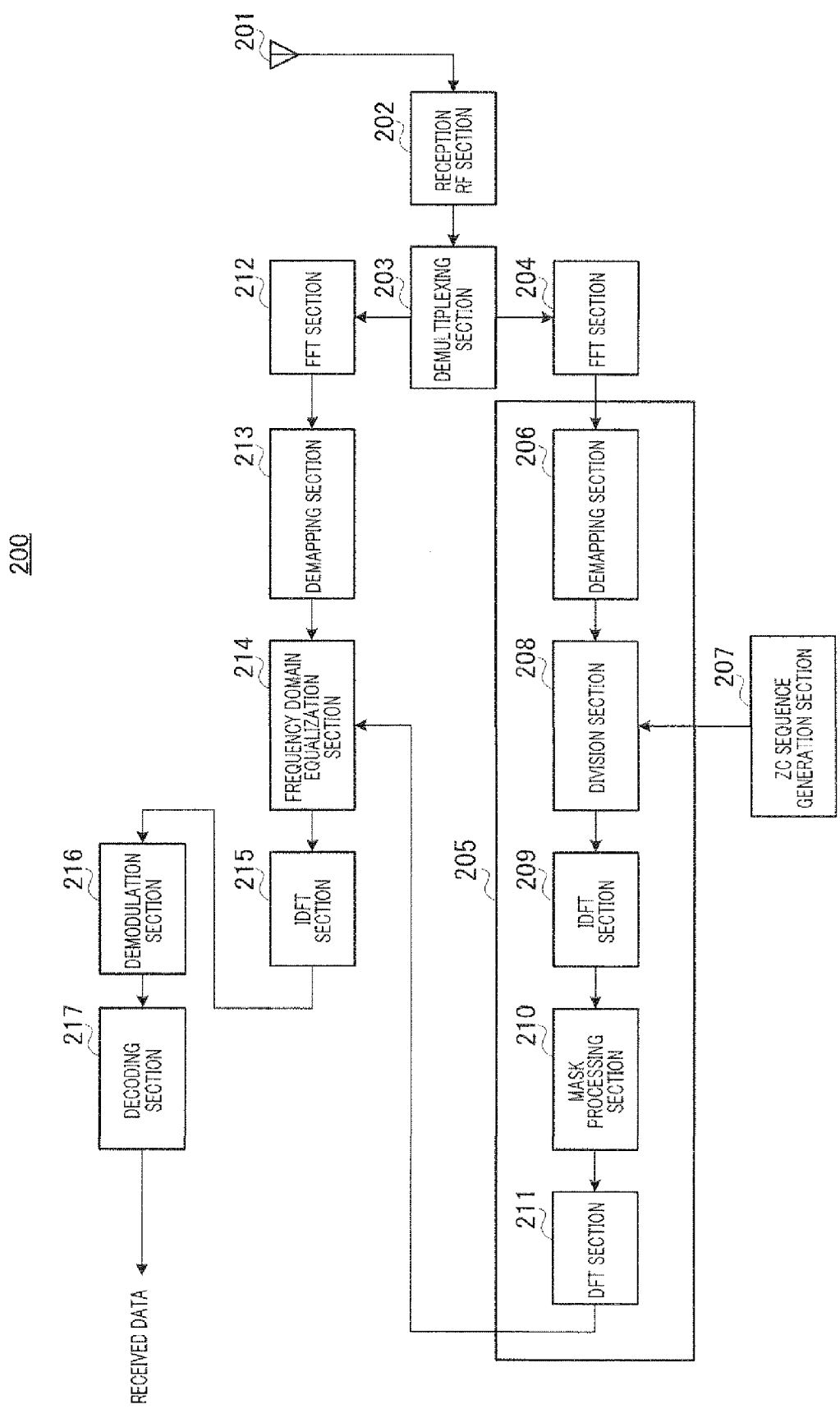
FIG. 5 is a block diagram illustrating a configuration of a radio communication apparatus in the receiving side according to embodiment 1 of the present invention.

FIG. 5 is a block diagram illustrating a configuration of radio communication apparatus 200 in the receiving side according to the present embodiment.

Reception RF section 202 applies reception processing such as down-conversion and A/D conversion to a signal received via antenna 201 and outputs the signal to which the reception processing has been applied to demultiplexing section 203.

Demultiplexing section 203 demultiplexes the signal inputted from reception RF section 202 into a reference signal and a data signal, outputs the reference signal to FFT (Fast Fourier Transform) section 204 and outputs the data signal to FFT section 212.

FFT section 204 applies FFT processing to a reference time domain signal inputted from demultiplexing section 203 to transform a time domain reference signal into a frequency domain signal and outputs the transformed frequency domain reference signal to demapping section 206 of channel estimation section 205.

Channel estimation section 205 has demapping section 206, division section 208, IDFT (Inverse Discrete Fourier Transform) section 209, mask processing section 210 and DFT (Discrete Fourier Transform) section 211, and performs channel estimation based on the reference signal inputted from FFT section 204.

Demapping section 206 extracts a frequency domain reference signal corresponding to the transmission band of each radio communication apparatus 100 in the transmitting side from the frequency domain reference signal inputted from FFT section 204 and outputs the extracted signal to division section 208.

ZC sequence generation section 207 generates a ZC sequence to be used in each radio communication apparatus 100 in the transmitting side in the same way as ZC sequence generation section 1000 (FIG. 4) of radio communication apparatus 100 in the transmitting side and outputs the ZC sequence to division section 208.

Division section 208 divides the signal inputted from demapping section 206 by the ZC sequence inputted from ZC sequence generation section 207 and outputs the divided signal to IDFT section 209.

IDFT section 209 applies IDFT processing to the signal inputted from division section 208 and outputs the signal to which the IDFT processing has been applied to mask processing section 210.

Mask processing section 210 extracts an interval in which the correlation value of the desired CS-ZC sequence exists, that is, extracts the correlation value of the detection range of the desired CS-ZC sequence by applying mask processing to the signal inputted from IDFT section 209 and outputs the extracted correlation value to DFT section 211.

DFT section 211 applies DFT processing to the correlation value inputted from mask processing section 210 and outputs the correlation value to which the DFT processing has been supplied to frequency domain equalization section 214. Here, the correlation value to which the DFT processing has been applied, which is outputted from DFT section 211, is a signal indicating a frequency response of the channel.

On the other hand, FFT section 212 applies FFT processing to the data signal in the time domain inputted from demultiplexing section 203 to transform the data signal to a signal in the frequency domain and outputs the data signal transformed into the frequency domain to demapping section 213.

Demapping section 213 extracts a frequency domain data signal corresponding to the transmission band of each radio communication apparatus 100 in the transmitting side from the data signal inputted from FFT section 212 and outputs each extracted signal to frequency domain equalization section 214.

Frequency domain equalization section 214 applies equalization processing to the data signal inputted from demapping section 213 using the signal indicating a frequency response of the channel inputted from DFT section 211 of channel estimation section 205 and outputs the data signal to which the equalization processing has been applied to IDFT section 215.

IDFT section 215 applies IDFT processing to the data signal inputted from frequency domain equalization section 214 and outputs the signal to which the IDFT processing has been applied to demodulation section 216.

Demodulation section 216 applies demodulation processing to the signal to which the IDFT processing has been applied, which is inputted from IDFT section 215, and outputs the signal to which the demodulation processing has been applied to decoding section 217.

Decoding section 217 applies decoding processing to the signal to which the demodulation processing has been applied, which is inputted from demodulation section 216, and extracts received data.

Next, details of the sequence length adjusting processing in sequence length adjusting section 103 will be described.

Hereinafter, the sequence length adjusting processing according to the number of truncated or extended symbols in the ZC sequence shown in equation 2 will be described.

Adjustment Example 1

When the Number of Symbols to be Truncated is 1

Here, sequence length $N_{ZC}$ is 13 and the number of subcarriers $N_{RB}$ corresponding to the transmission bandwidth of RS is 12. That is, sequence length adjusting section 103 truncates one symbol.

Figure 6:
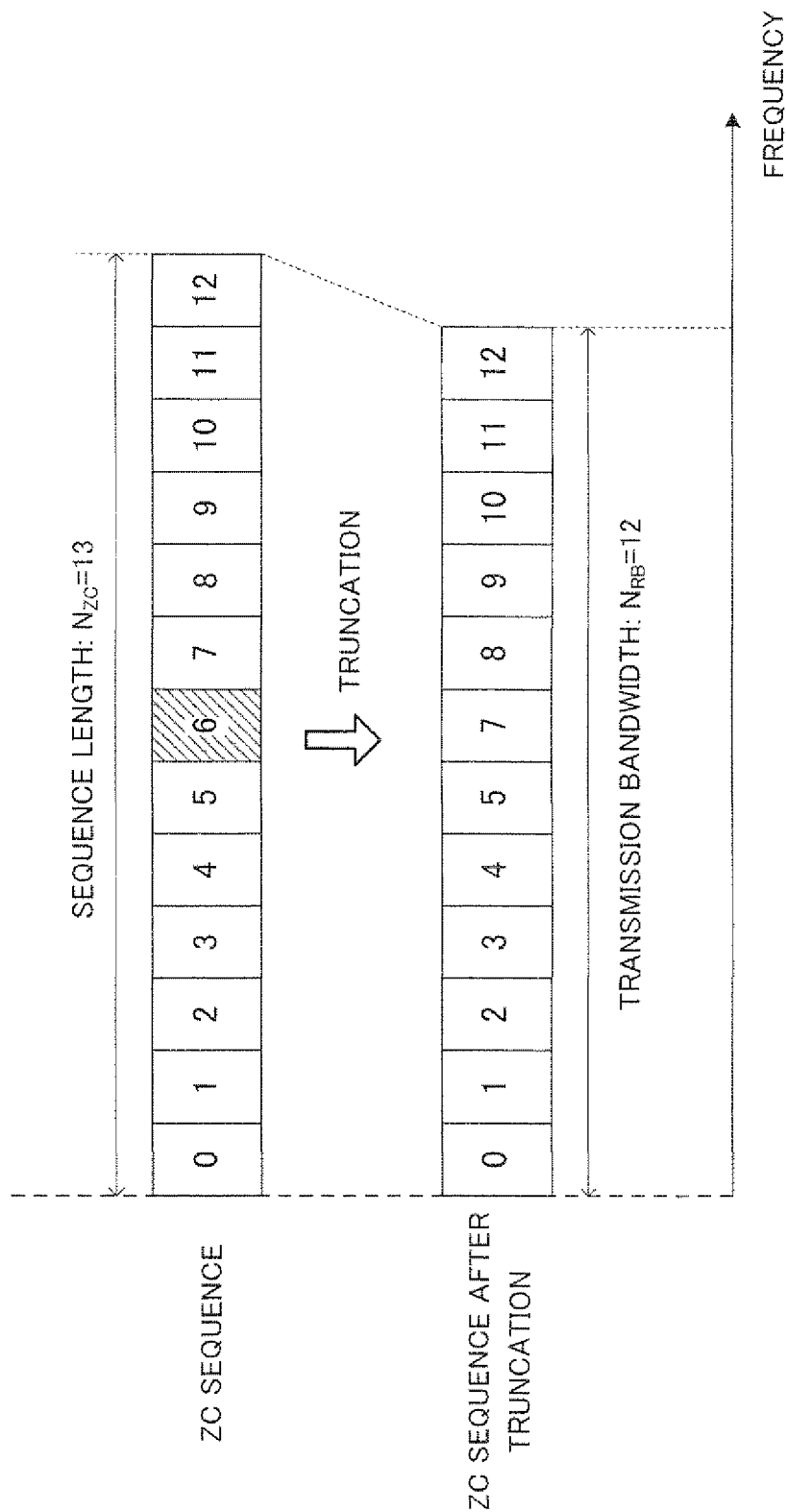
FIG. 6 is a diagram illustrating truncation processing according to embodiment 1 of the present invention (adjustment example 1)

Therefore, among a plurality of symbols constituting a ZC sequence, sequence length adjusting section 103 truncates the symbol located in the center. To be more specific, among 13 symbols of the symbol numbers n=0 to 12 constituting a ZC sequence as shown in FIG. 6, sequence length adjusting section 103 truncates the symbol of the symbol number n=6 located in the center. By this means, sequence length adjusting section 103 obtains a ZC sequence of 12 symbols constituting symbol numbers n=0 to 5 and n=7 to 12 in that order as shown in FIG. 6.

Here, as described above in FIG. 3, the symbols of the symbol numbers n=0 to 5 and the symbols of the symbol numbers n=12 to 7 have the same amplitude respectively and have an even-symmetrical relationship centered around the symbol of the symbol number n=6 located in the center. On the other hand, the symbol of the symbol number n=6 located in the center is not symmetrical to any other symbols. Thus, even when the symbol of the symbol number n=6 is truncated, the symmetry of the entire ZC sequence is maintained.

Figure 7:
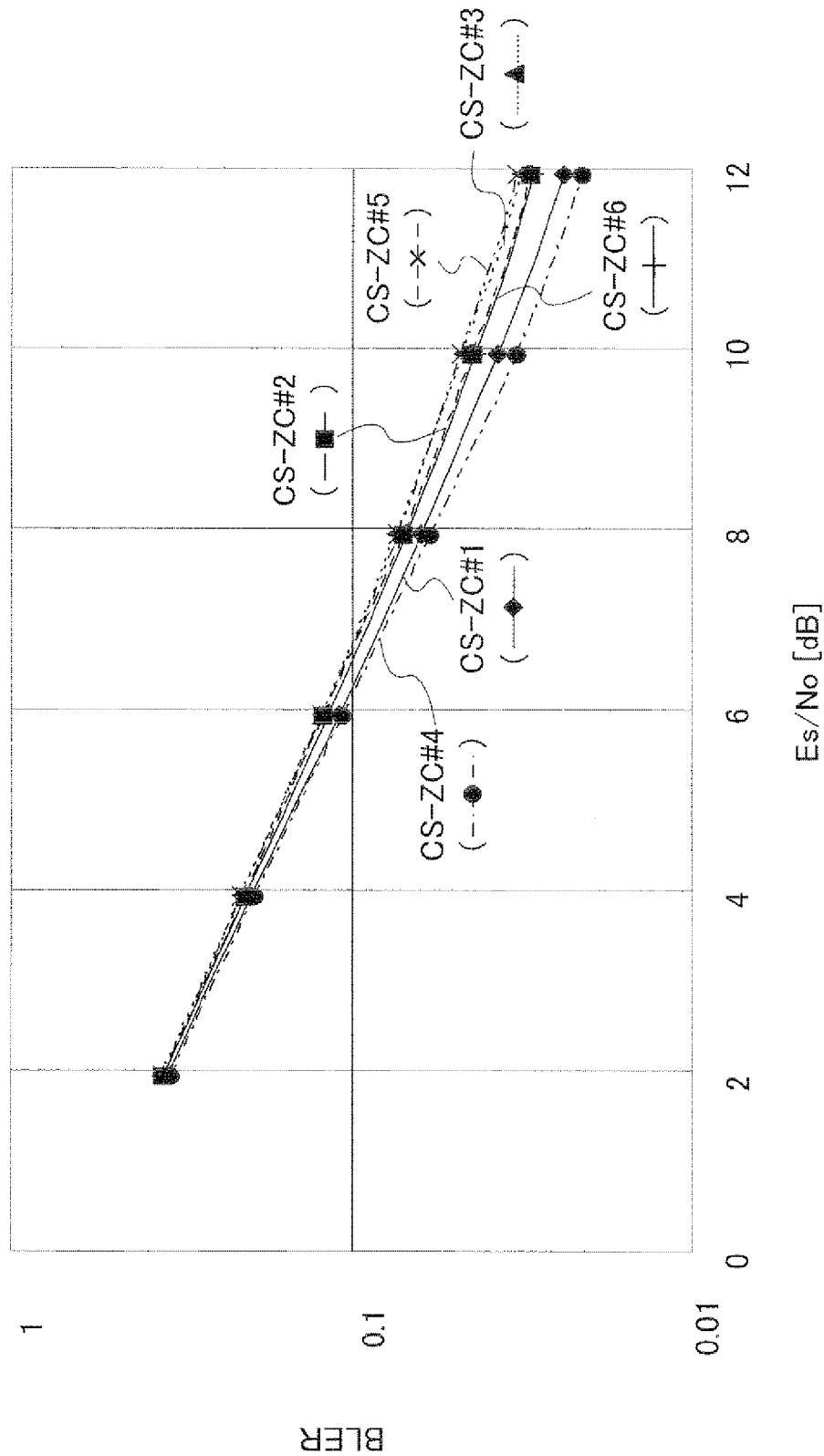
FIG. 7 is a diagram illustrating a BLER performance of a CS-ZC sequence according to embodiment 1 of the present invention.

FIG. 7 shows a result of a BLER performance obtained through computer simulation by the present inventors. Here, sequence length $N_{ZC}$ is 13 as with the case of FIG. 1. Moreover, in FIG. 1, the symbol of the symbol number n=12 located at the end of the ZC sequence is truncated, whereas in FIG. 7, the symbol of the symbol number n=6 located in the center of the ZC sequence is truncated.

Figure 1:
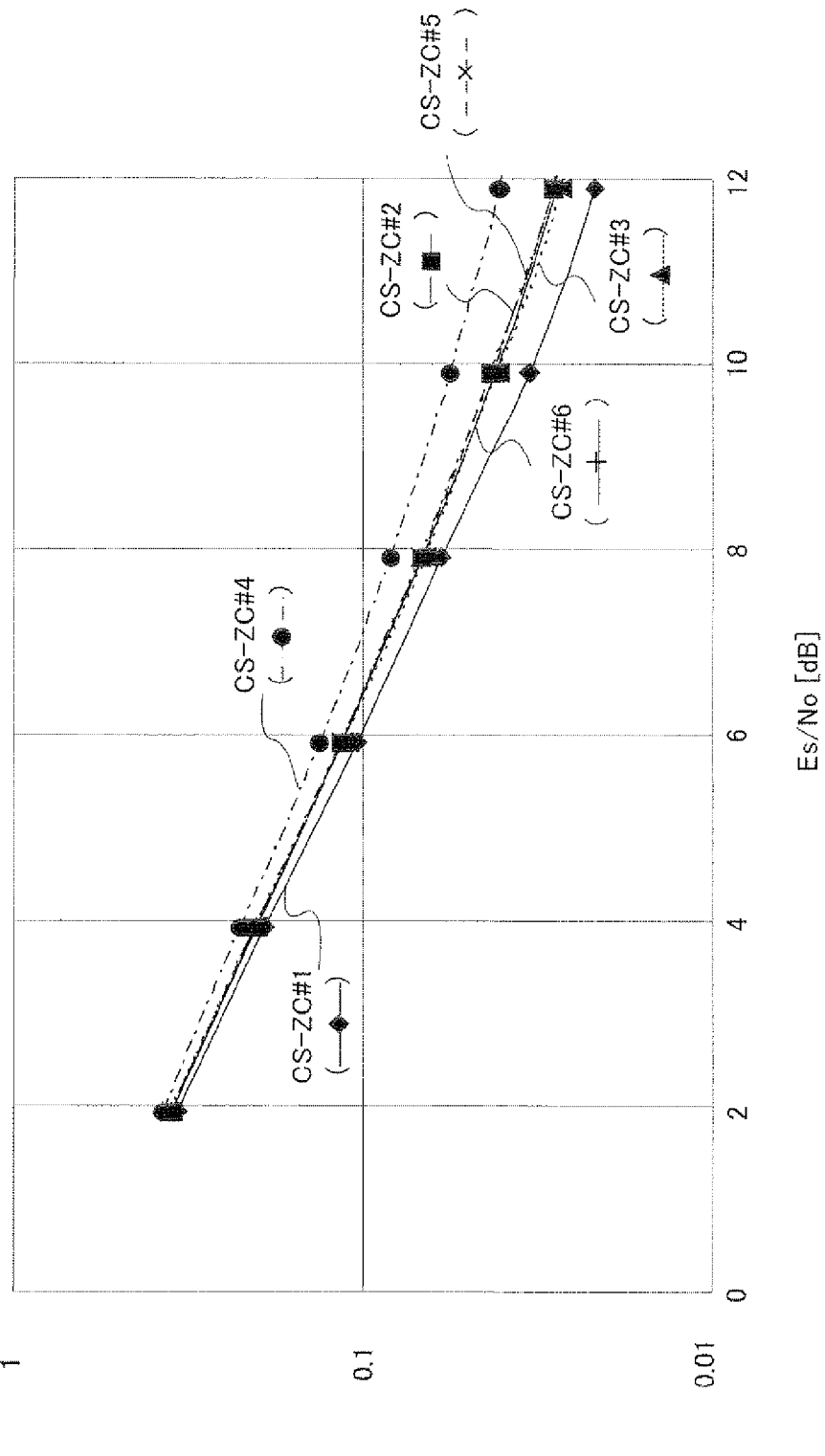
FIG. 1 is a diagram illustrating a BLER performance of a CS-ZC sequence when the last symbol of a ZC sequence is truncated.

It is observed from FIG. 7 that the BLER performance of CS-ZC sequence #4 is best although it has been poorest in FIG. 1. Moreover, with regard to a required Es/No which satisfies BLER-0.1 (10%), it is observed that there is a difference of approximately 0.2 dB between CS-ZC sequence #4 and CS-ZC sequence #5 having the worst BLER performance. Thus, it is observed that variation in the BLER performance among CS-ZC sequence numbers #1 to 6 decreases compared to the BLER performance shown in FIG. 1.

Thus, by truncating a symbol while maintaining symmetry of the ZC sequence, it is possible to prevent BLER performances of a part of CS-ZC sequences from degrading.

Thus, according to the present adjustment example, by truncating the symbol located in the center of the ZC sequence, the symmetry of the ZC sequence after truncation is maintained. Thus, even when a CS-ZC sequence is used, no cross-correlation peak occurs among CS-ZC sequences of different CS-ZC sequence numbers (different amounts of cyclic shift), and therefore it is possible to prevent the BLER performance from degrading.

Adjustment Example 2

When the Number of Symbols to be Extended is 1

Here, sequence length $N_{ZC}$ is 11 and the number of subcarriers $N_{RB}$ corresponding to a transmission bandwidth of RS is 12. That is, sequence length adjusting section 103 extends one symbol.

Figure 8:
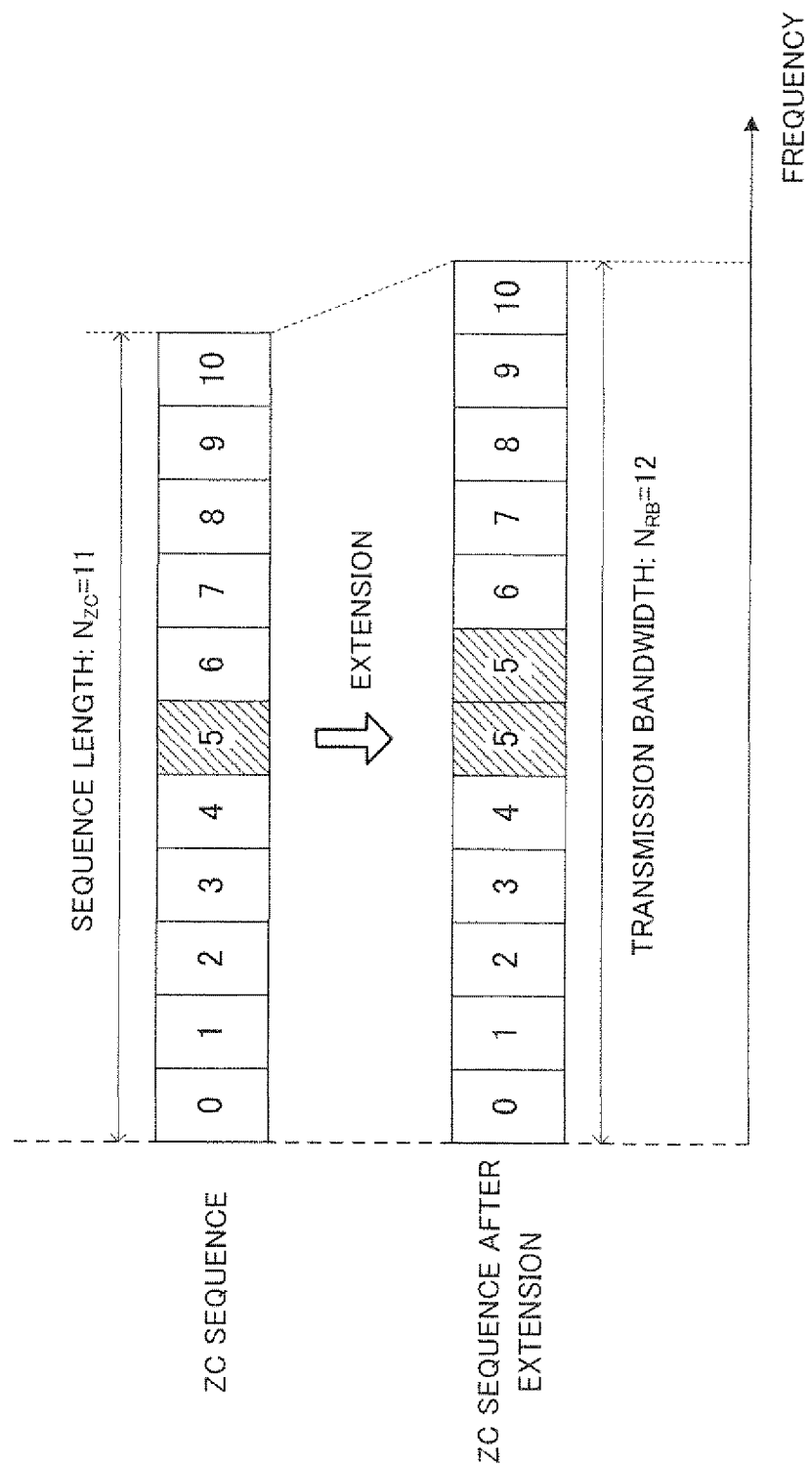
FIG. 8 is a diagram illustrating extension processing according to embodiment 1 of the present invention (adjustment example 2)

Therefore, among a plurality of symbols constituting a ZC sequence, sequence length adjusting section 103 extends the symbol located in the center. To be more specific, among 11 symbols of the symbol numbers n=0 to 10 constituting the ZC sequence as shown in. FIG. 8, sequence length adjusting section 103 extends the symbol of the symbol number n=5 located in the center. The symbol newly generated by extension is placed at a position neighboring the extended symbol. By this means, sequence length adjusting section 103 obtains a ZC sequence of 12 symbols made up of the symbol numbers n=0 to 5, n=5, n=6 to 10 in that order as shown in FIG. 8.

Here, the symbols of the symbol numbers n=0 to 4 have the same amplitude as the symbols of the symbol numbers n=10 to 6 respectively and have a symmetrical relationship. Moreover, the symbol of the symbol number n=5 located in the center of the ZC sequence before extension has the same amplitude as that of the symbol of the symbol number n=5 generated by extension. Therefore, the two symbols of the symbol number n=5 have a symmetrical relationship. That is, among the ZC sequence after extension shown in FIG. 8, six symbols of the symbol numbers n=0 to 5 from the beginning are even-symmetrical to six symbols of the symbol numbers n=12 to 5 from the end centered around the midpoint of the two symbols of the symbol number n=5. Therefore, with the ZC sequence after extension, the symmetry of the entire ZC sequence is maintained.

Thus, according to the present adjustment example, symmetry of the ZC sequence after extension is maintained, and therefore it is possible to obtain an effect similar to that in adjustment example 1.

Adjustment Example 3

When the Number of Symbols to be Truncated is Plural and Odd-Numbered

Here, sequence length $N_{ZC}$ is 17 and the number of subcarriers $N_{RB}$ corresponding to the transmission bandwidth of RS is 12. That is, sequence length adjusting section 103 truncates five symbols.

Figure 9:
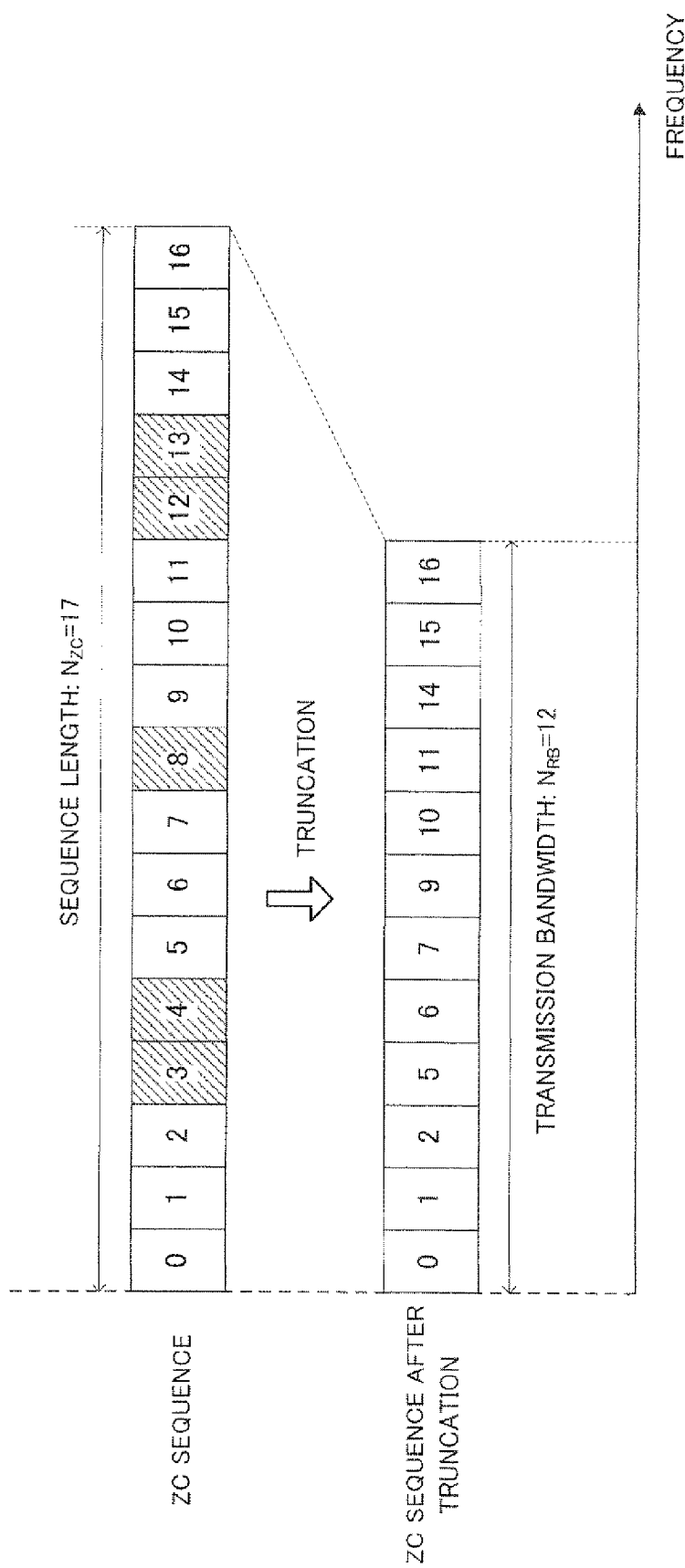
FIG. 9 is a diagram illustrating truncation processing according to embodiment 1 of the present invention (adjustment example 3)

Therefore, among the plurality of symbols constituting the ZC sequence, sequence length adjusting section 103 truncates the symbol located in the center and symbols located at even intervals before and after the symbol located in the center. To be more specific, among 17 symbols of the symbol numbers n=0 to 16 constituting the ZC sequence as shown in FIG. 9, sequence length adjusting section 103 truncates the symbol of the symbol number n=8 located in the center. Moreover, as shown in FIG. 9, sequence length adjusting section 103 truncates two symbols of the symbol numbers n=4 and n=12 located apart by four symbols before and after the symbol of the symbol number n=8. Likewise, sequence length adjusting section 103 truncates two symbols of the symbol numbers n=3 and n=13 located apart by five symbols before and after the symbol of the symbol number n=8. By this means, sequence length adjusting section 103 obtains a ZC sequence of 12 symbols constituting symbols of the symbol numbers n=0 to 2, n=5 to 7, n=9 to 11 and n=14 to 16 in that order as shown in FIG. 9.

Here, the symbols of the symbol numbers n=3 and n=13 have a symmetrical relationship, and the symbols of the symbol numbers n=4 and n=12 have a symmetrical relationship. Therefore, even if these four symbols in a symmetrical relationship with each other are truncated, symmetry among other symbols is not lost, and therefore the symmetry of the entire ZC sequence is maintained. Moreover, even if the symbol of the symbol number n=8 located in the center of the ZC sequence is truncated, the symmetry of the entire ZC sequence is maintained as with the case of adjustment example 1.

As described above, according to the present adjustment example, even when the number truncated symbols in a ZC sequence is plural and odd-numbered, an effect similar to that in adjustment example 1 can be obtained.

Adjustment Example 4

When the Number of Symbols to be Truncated is Plural and Odd-Numbered

The present adjustment example differs from adjustment example 3 in that symbols located contiguous to symbols neighboring both sides of the symbol located in the center of the ZC sequence are truncated.

Here, sequence length $N_{ZC}$ is 17 and the number of subcarriers $N_{RB}$ corresponding to the transmission bandwidth of RS is 12 as with the case of adjustment example 3. That is, sequence length adjusting section 103 truncates five symbols.

Figure 10:
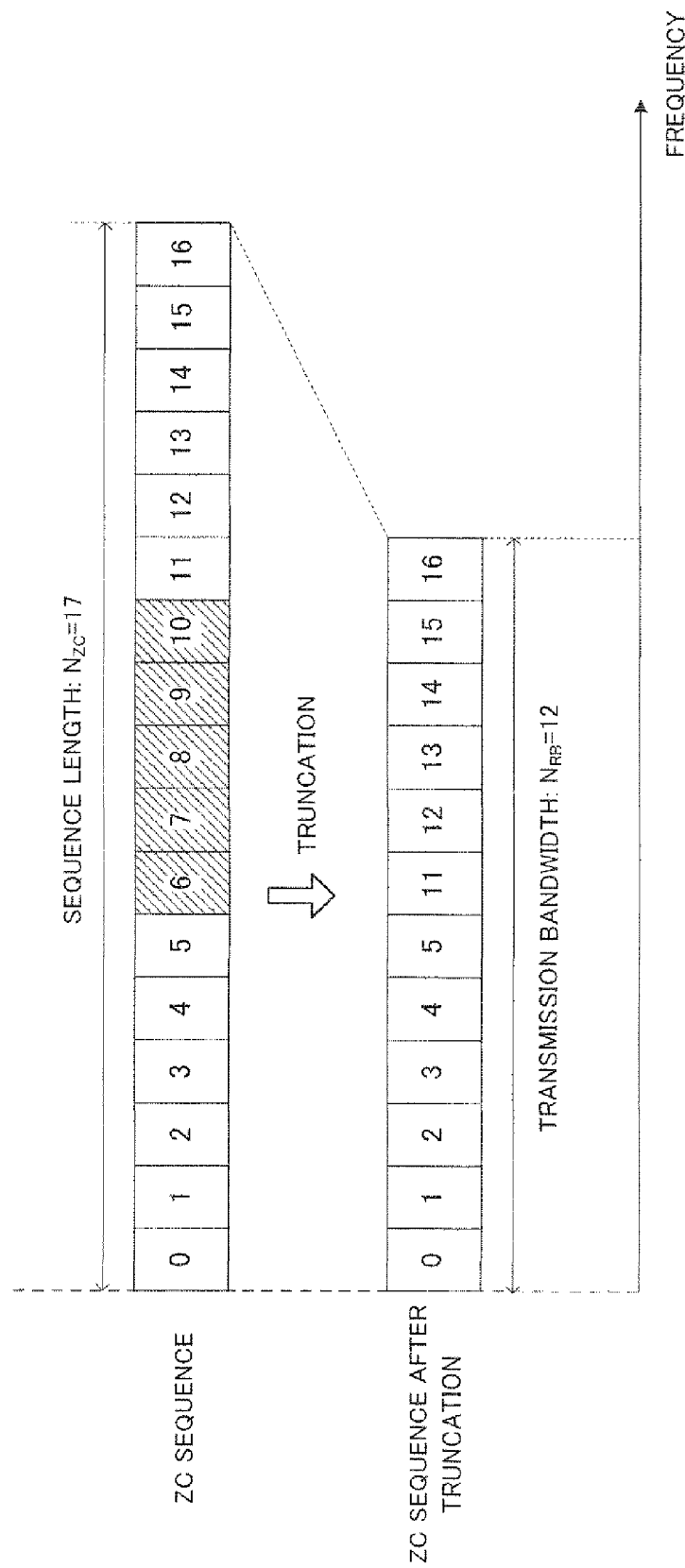
FIG. 10 is a diagram illustrating truncation processing according to embodiment 1 of the present invention (adjustment example 4)

Of the plurality of symbols constituting a ZC sequence, sequence length adjusting section 103 according to the present adjustment example truncates the symbol located in the center and symbols contiguous to the symbols neighboring both sides of the symbol located in the center. To be more specific, as shown in FIG. 10, among 17 symbols of the symbol numbers n=0 to 16 constituting the ZC sequence, sequence length adjusting section 103 truncates the symbol of the symbol number n=8 as with the case of adjustment example 3. Moreover, sequence length adjusting section 103 truncates two symbols of the symbol numbers n=7 and n=9 located neighboring both sides of the symbol of the symbol number n=8. Furthermore, sequence length adjusting section 103 truncates two symbols of the symbol numbers n=6 and n=10 neighboring the symbols of the symbol numbers n=7 and n=9 respectively. That is, among 17 symbols constituting the ZC sequence, sequence length adjusting section 103 truncates five symbols of serial symbol numbers centered around the symbol of the symbol number n=8. By this means, sequence length adjusting section 103 obtains a ZC sequence of 12 symbols constituting the symbols of the symbol numbers n=0 to 5 and n=11 to 16 in that order as shown in FIG. 10.

Here, the ZC sequence after truncation in the present adjustment example shown in FIG. 10 will be compared with the ZC sequence after truncation in adjustment example 3 shown in FIG. 9. In adjustment example 3, as shown in FIG. 9, symbol numbers become discontinuous at three locations; between the symbols of the symbol numbers n=2 and n=5, between the symbols of the symbol numbers n=7 and n=9 and between the symbols of the symbol numbers n=11 and n=14. Thus, CM (Cubic Metric) (or PAPR (Peak to Average Power Ratio)) increases as the number of discontinuous points increases. On the other hand, in the present adjustment example, as shown in FIG. 10, symbol numbers are discontinuous in only one location between the symbols of the symbol numbers n=5 and n=11.

That is, in the present adjustment example, it is possible to reduce the number of discontinuous points in the ZC sequence after truncation compared to adjustment example 3. This allows CM caused by discontinuous points in a ZC sequence to be reduced.

As described above, according to the present adjustment example, when the number of truncated symbols in the ZC sequence is plural and odd-numbered, it is possible to minimize the number of discontinuous points in a ZC sequence in the transmission band of RS. This allows CM generated by truncation to be reduced while achieving an effect similar to that in adjustment example 1.

Adjustment Example 5

When the Number of Symbols to be Extended is Plural and Odd-Numbered

Here, sequence length $N_{ZC}$ is 9 and the number of subcarriers $N_{RB}$ corresponding to the transmission bandwidth of RS is 12. That is, sequence length adjusting section 103 extends three symbols.

Figure 11:
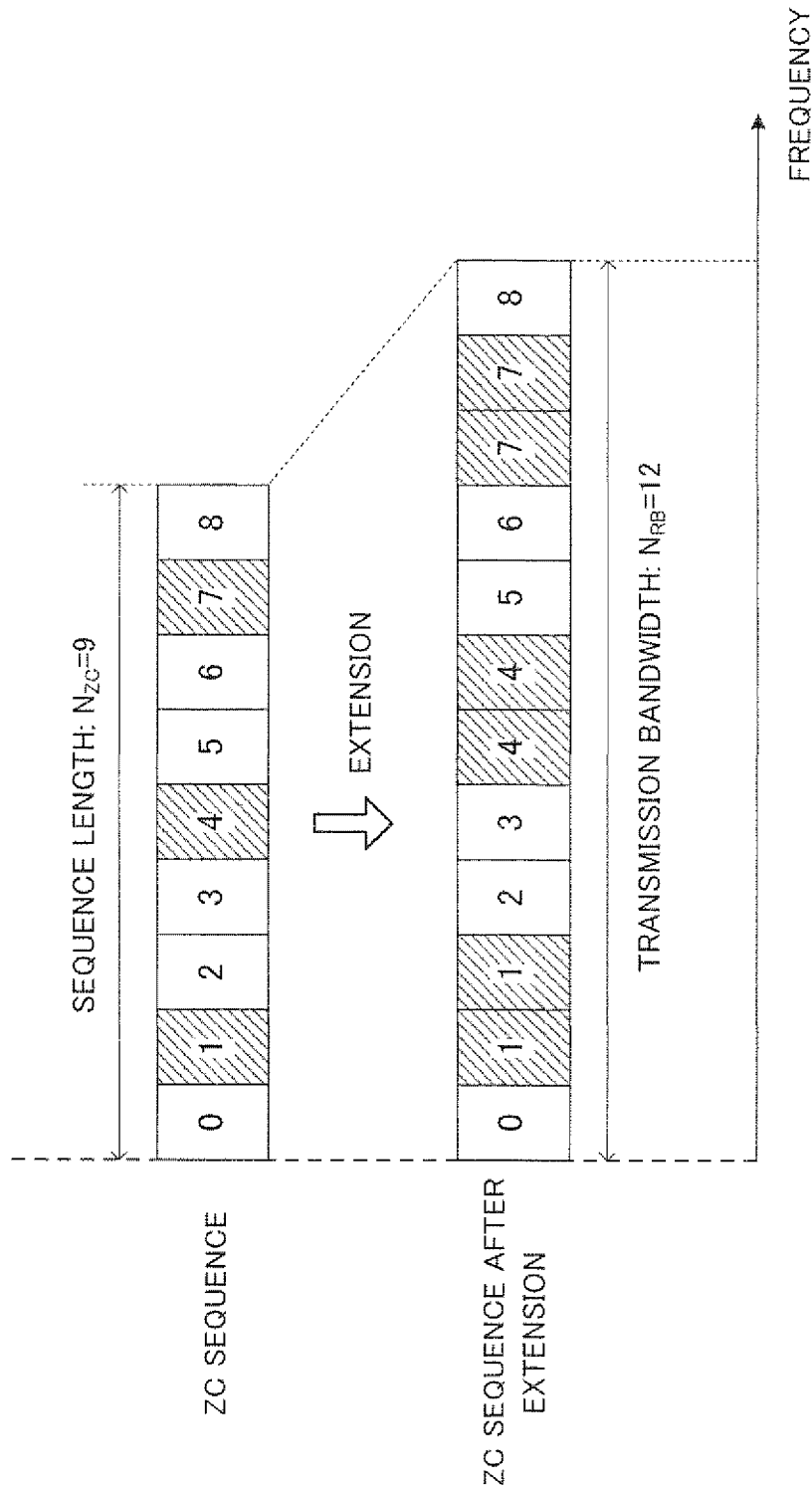
FIG. 11 is a diagram illustrating extension processing according to embodiment 1 of the present invention (adjustment example 5)

Therefore, of the plurality of symbols constituting a ZC sequence, sequence length adjusting section 103 extends a symbol located in the center and a plurality of symbols located at even intervals before and after the symbol located in the center. To be more specific, of 9 symbols of the symbol numbers n=0 to 8 constituting the ZC sequence as shown in FIG. 11, sequence length adjusting section 103 extends the symbol of the symbol number n=4 located in the center. Moreover, sequence length adjusting section 103 extends two symbols of the symbol numbers n=1 and n=7 located apart by three symbols before and after the symbol of the symbol number n=4 as shown in FIG. 11. The symbols generated by extension are placed in positions neighboring the extended symbols. By this means, sequence length adjusting section 103 obtains a ZC sequence of 12 symbols constituting the symbol numbers of n=0, 1, 1, 2, 3, 4, 4, 5, 6, 7, 7, 8 in that order as shown in FIG. 11.

Here, the symbols of the symbol numbers n=1 and n=7 of the ZC sequence before extension have a symmetrical relationship. Moreover, the symbols of the symbol numbers n=1 and n=7 newly generated by extension are placed in positions neighboring the extended symbols respectively. As a result of this, two symbols of the symbol number n=1 and two symbols of the symbol number n=7 of the ZC sequence after extension are even-symmetrical with respect to the center of the ZC sequence as with the case of the ZC sequence before extension. Moreover, the two symbols of the symbol number n=4 located in the center of the ZC sequence after extension have a symmetrical relationship as with the case of adjustment example 2. Therefore, as shown in FIG. 11, the symmetry of the entire ZC sequence is maintained even when symbols of the ZC sequence are extended.

As described above, according to the present adjustment example, even when the number of extended symbols of a ZC sequence is plural and odd-numbered, an effect similar to that in adjustment example 1 can be obtained.

Adjustment Example 6

When the Number of Symbols to be Extended is Plural and Odd-Numbered

The present adjustment example is different from adjustment example 5 in that symbols located contiguous to symbols neighboring both sides of a symbol located in the center of a ZC sequence are extended.

Here, as the same manner as adjustment example 5, sequence length $N_{ZC}$ is 9 and the number of subcarriers $N_{RB}$ corresponding to the transmission bandwidth of RS is 12. That is, sequence length adjusting section 103 extends three symbols.

Figure 12:
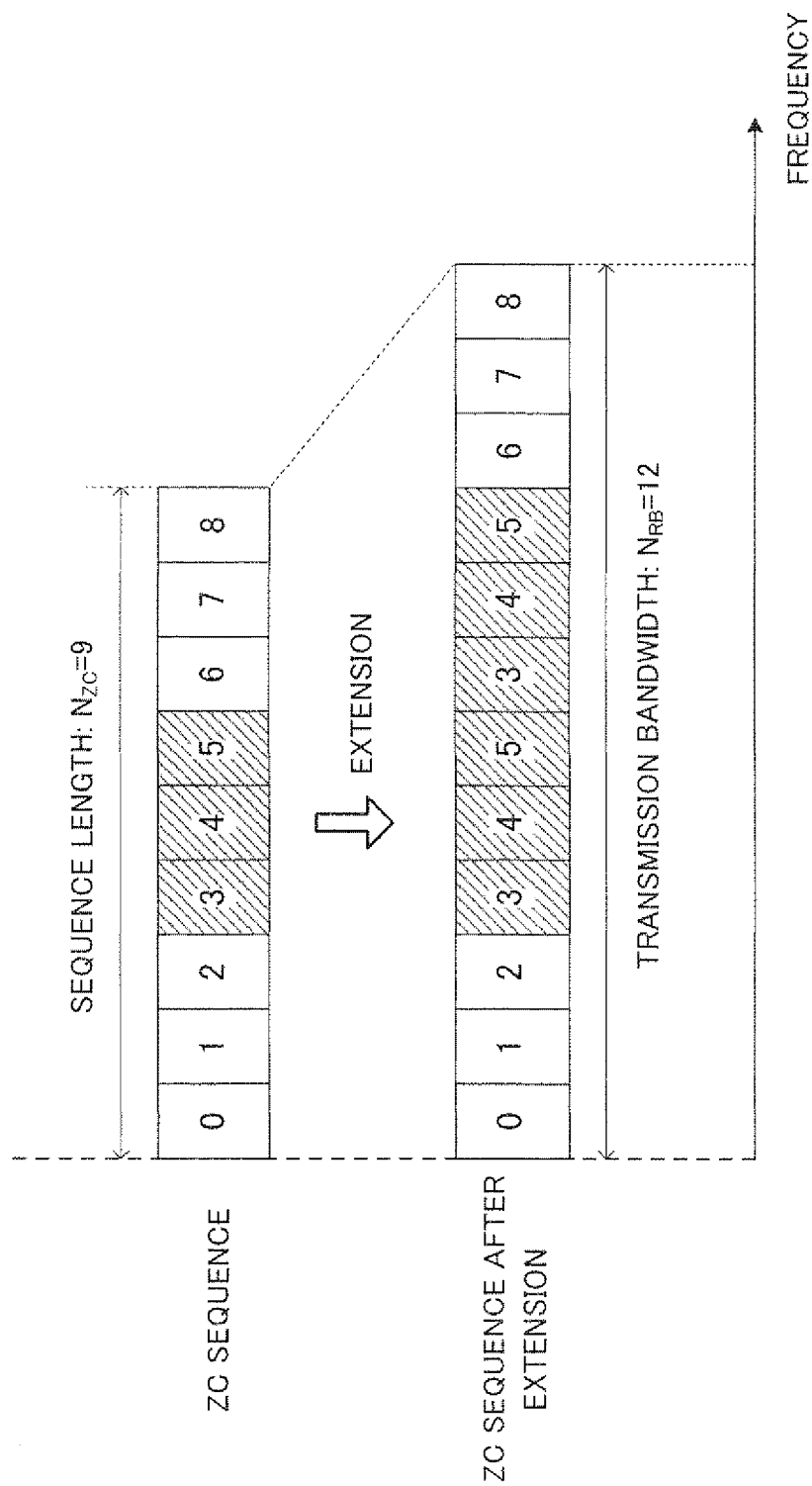
FIG. 12 is a diagram illustrating extension processing according to embodiment 1 of the present invention (adjustment example 6)

Of a plurality of symbols constituting a ZC sequence, sequence length adjusting section 103 according to this example extends a symbol located in the center and continuous symbols neighboring both sides of the symbol located in the center. To be more specific, of 9 symbols of the symbol numbers n=0 to 8 constituting the ZC sequence as shown in FIG. 12, sequence length adjusting section 103 extends the symbol of the symbol number n=4 as with the case of adjustment example 5. Moreover, sequence length adjusting section 103 extends two symbols of the symbol numbers n=3 and n=5 located neighboring both sides of the symbol of the symbol number n=4. That is, of the 9 symbols constituting the ZC sequence, sequence length adjusting section 103 extends the three symbols of the serial symbol numbers centered around the symbol of the symbol number n=4. By this means, sequence length adjusting section 103 obtains a ZC sequence of 12 symbols of the symbol numbers n=0 to 5, n=3 to 8 in that order as shown in FIG. 12.

Here, the ZC sequence after extension in the present adjustment example shown in FIG. 12 will be compared with the ZC sequence after extension in adjustment example 5 shown in FIG. 11. In adjustment example 5, as shown in FIG. 11, symbol numbers are discontinuous at three locations; between two symbols of the symbol number n=1, between two symbols of the symbol number n=4 and between two symbols of the symbol number n=7. On the other hand, in the present adjustment example, as shown in FIG. 12, symbol numbers are discontinuous only at one location between the symbols of the symbol numbers n=5 and n=3 located in the vicinity of the center of the ZC sequence after extension.

That is, according to the present adjustment example, it is possible to reduce the number of discontinuous points in the ZC sequence after extension compared to adjustment example 5, and therefore CM can be reduced.

As described above, according to the present adjustment example, even when the number of symbols extended of the ZC sequence is plural and odd-numbered, it is possible to reduce the number of discontinuous points in the ZC sequence in the transmission band of RS to a minimum. This makes it possible to reduce CM caused by extension while obtaining an effect similar to that in adjustment example 1.

Adjustment Example 7

When the Number of Symbols to be Truncated is Even-Numbered

Here, sequence length $N_{ZC}$ is 17 and the number of subcarriers $N_{RB}$ corresponding to the transmission bandwidth of RS is 13. That is, sequence length adjusting section 103 truncates four symbols.

Figure 13:
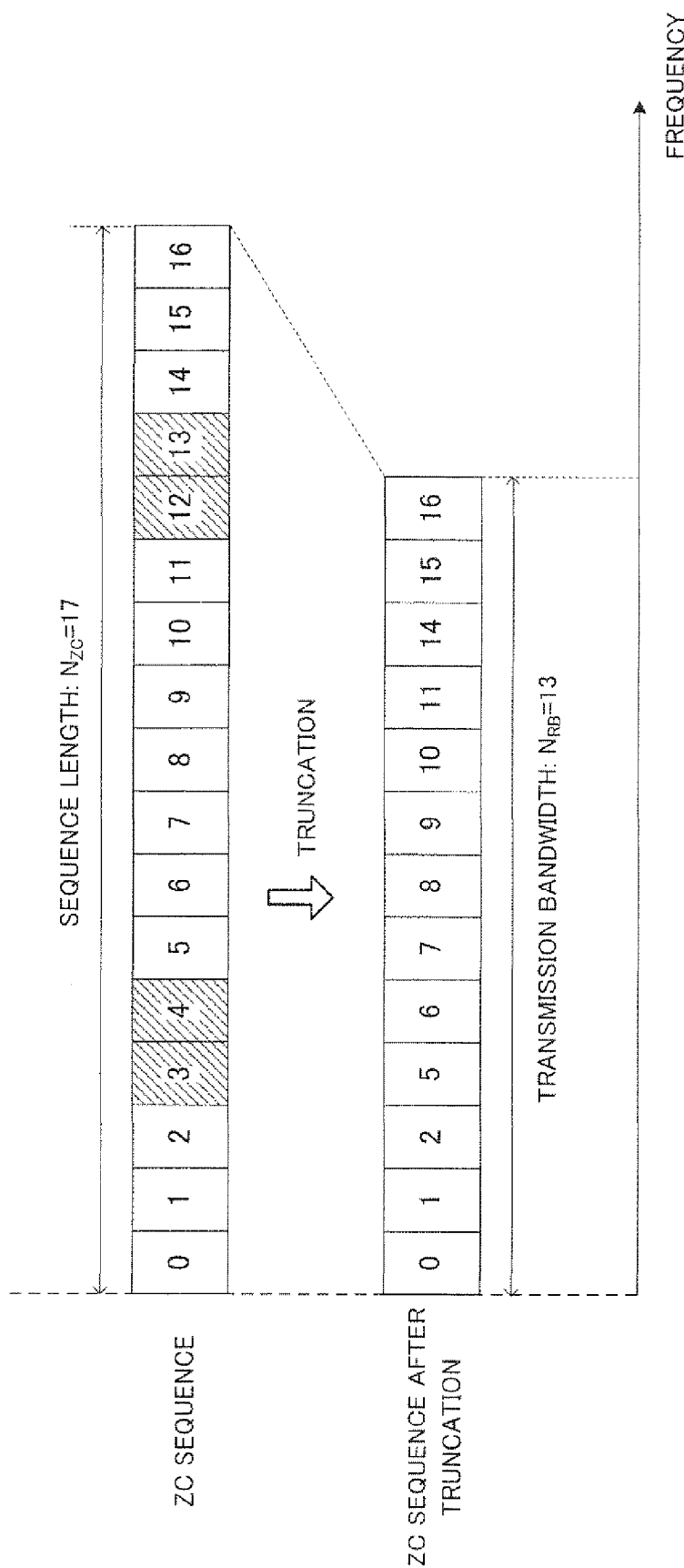
FIG. 13 is a diagram illustrating extension processing according to embodiment 1 of the present invention (adjustment example 7)

Therefore, of a plurality of symbols constituting a ZC sequence, sequence length adjusting section 103 truncates a plurality of symbols located at even intervals before and after a symbol located in the center. To be more specific, as shown in FIG. 13, of 17 symbols of the symbol numbers n=0 to 16 constituting the ZC sequence, sequence length adjusting section 103 truncates two symbols of the symbol numbers n=4 and n=12 located apart by four symbols before and after the symbol of the symbol number n=8 located in the center. In the same way, sequence length adjusting section 103 truncates two symbols of the symbol numbers n=3 and n=13 located apart by five symbols before and after the symbol of the symbol number n=8. By this means, sequence length adjusting section 103 obtains a ZC sequence of 13 symbols of the symbol numbers n=0 to 2, n=5 to 11, n=14 to 16 in that order as shown in FIG. 13.

When the ZC sequence after truncation in the present adjustment example shown in FIG. 13 is compared with the ZC sequence after truncation in adjustment example 3 shown in FIG. 9, the present adjustment example is the same as adjustment example 3 except in that the symbol of the symbol number n=8 located in the center of the ZC sequence is not truncated. Here, the ZC sequence before truncation shown in FIG. 13 is even-symmetrical centered around the symbol of the symbol number n=8 and the symbol of the symbol number n=8 has no symmetrical relationship with any other symbols. Therefore, even when the symbol of the symbol number n=8 located in the center of the ZC sequence is not truncated as with the case of the present adjustment example, the ZC sequence after truncation becomes even-symmetrical centered around the symbol of the symbol number n=8. Thus, in the present adjustment example, the symmetry after truncation is maintained as with the case of adjustment example 3.

That is, when the number of symbols truncated of the ZC sequence whose sequence length is odd-numbered (adjustment examples 1 to 6), the symbol located in the center of the ZC sequence is truncated and when the number of symbols of the truncated ZC sequence is even-numbered (present adjustment example and adjustment example 8 described later), the symbol located in the center of the ZC sequence is not truncated. This allows the ZC sequence after truncation to maintain symmetry.

As described above, according to the present adjustment example, symmetry of the entire ZC sequence is maintained even when the number of symbols of the truncated ZC sequence is even-numbered, and therefore it is possible to obtain an effect similar to that in adjustment example 1.

Adjustment Example 8

When the Number of Symbols to be Extended is Even-Numbered

Here, sequence length $N_{ZC}$ is 9 and the number of subcarriers $N_{RB}$ corresponding to the transmission bandwidth of RS is 11. That is, sequence length adjusting section 103 extends two symbols.

Figure 14:
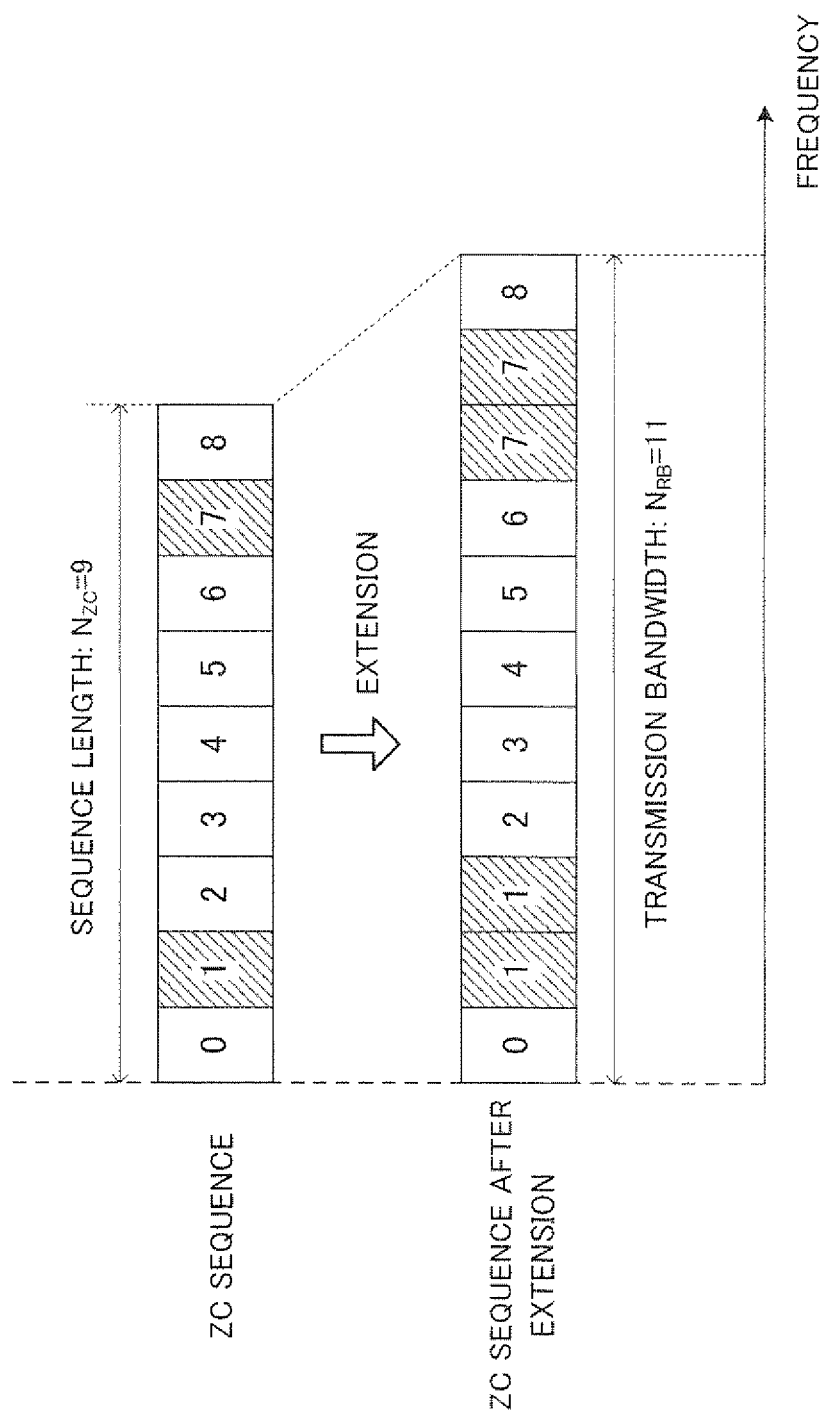
FIG. 14 is a diagram illustrating extension processing according to embodiment 1 of the present invention (adjustment example 8)

Therefore, of a plurality of symbols constituting a ZC sequence, sequence length adjusting section 103 extends a plurality of symbols located at even intervals before and after a symbol located in the center. To be more specific, of 9 symbols of the symbol numbers n=0 to 8 constituting the ZC sequence as shown in FIG. 14, sequence length adjusting section 103 extends two symbols of the symbol numbers n=1 and n=7 located apart by three symbols before and after the symbol of number n=4 located in the center. Symbols generated by extension are placed in positions neighboring the symbols to be extended. By this means, sequence length adjusting section 103 obtains a ZC sequence of 11 symbols of the symbol numbers n=0, 1, 1, 2, 3, 4, 5, 6, 7, 7, 8 in that order as shown in FIG. 14.

When the ZC sequence after extension in the present adjustment example shown in FIG. 14 is compared with the ZC sequence after extension in adjustment example 5 shown in FIG. 11, the present adjustment example is the same as adjustment example 5 except in that the symbol of the symbol number n=4 located in the center of the ZC sequence is not extended. That is, the ZC sequence after extension shown in FIG. 14 is even-symmetrical centered around the symbol of the symbol number n=4. Therefore, according to the present adjustment example, the symmetry of the ZC sequence after truncation is maintained as with the case of adjustment example 5.

AS described above, according to the present adjustment example, the symmetry of the entire ZC sequence is maintained even when the number of extended symbols in the ZC sequence is even-numbered, and an effect similar to that of adjustment example 1 can be obtained.

Sequence length adjustment examples 1 to 8 of sequence length adjusting section 103 have been described so far.

In this way, according to the present embodiment, a ZC sequence is truncated or extended while symmetry of the ZC sequence is maintained, and therefore occurrence of cross-correlation peaks between ZC sequences having different sequence numbers can be prevented. By this means, even when a CS-ZC sequence is used, no cross-correlation peak occurs among CS-ZC sequences having different CS-ZC sequence numbers, and therefore it is possible to reduce degradation of BLER.

Embodiment 2

With the present embodiment, symbols to be truncated or extended is shifted to an end of a ZC sequence.

Now, the present embodiment will be described more specifically.

Figure 15:
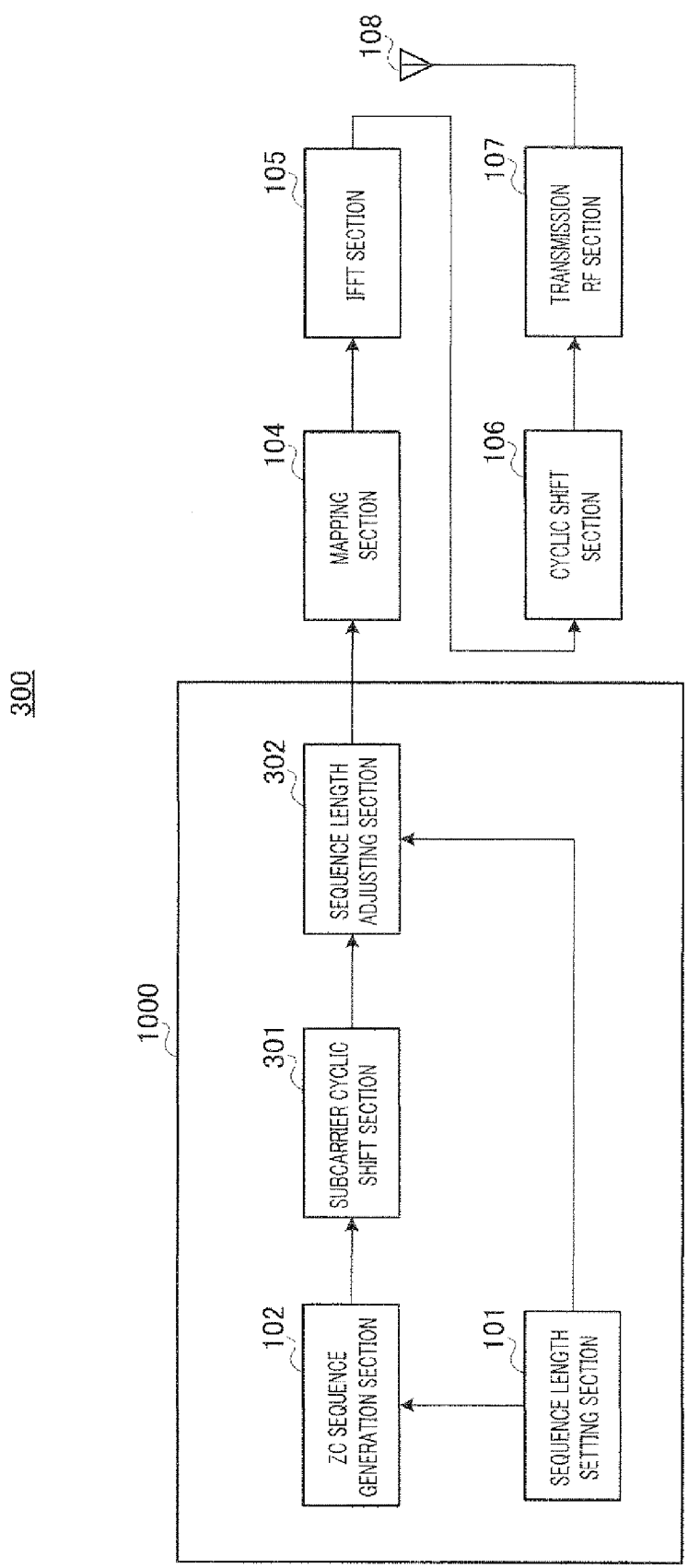
FIG. 15 is a block diagram illustrating a configuration of a radio communication apparatus in the transmitting side according to embodiment 2 of the present invention.

FIG. 15 is a block diagram illustrating a configuration of radio communication apparatus 300 in the transmitting side according to the present embodiment.

In radio communication apparatus 300 in the transmitting side shown in FIG. 15, subcarrier cyclic shift section 301 specifies a symbol to be truncated or extended by sequence length adjusting section 302 from a plurality of symbols constituting a ZC sequence inputted from ZC sequence generation section 102, in the same manner as sequence length adjusting section 103 of embodiment 1 (FIG. 4). Subcarrier cyclic shift section 301 then cyclically shifts symbols in the frequency domain so that the specified symbol is located at an end of the ZC sequence. Subcarrier cyclic shift section 301 outputs the ZC sequence after the cyclic shift to sequence length adjusting section 302.

Of a plurality of symbols constituting the ZC sequence inputted from subcarrier cyclic shift section 301, sequence length adjusting section 302 truncates or extends the symbol located at the end of the ZC sequence to adjust the sequence length to the number of subcarriers $N_{RB}$ corresponding to the transmission bandwidth of RS. Sequence length adjusting section 302 then outputs the truncated or extended ZC sequence to mapping section 104.

Next, details of subcarrier cyclic shift processing in subcarrier cyclic shift section 301 will be described.

A case in which a ZC sequence is truncated will be described first. Here, sequence length $N_{ZC}$ is 13 and the number of subcarriers $N_{RB}$ corresponding to the transmission bandwidth of RS is 12 as with the case of adjustment example 1 of embodiment 1. That is, sequence length adjusting section 302 truncates one symbol.

Figure 16:
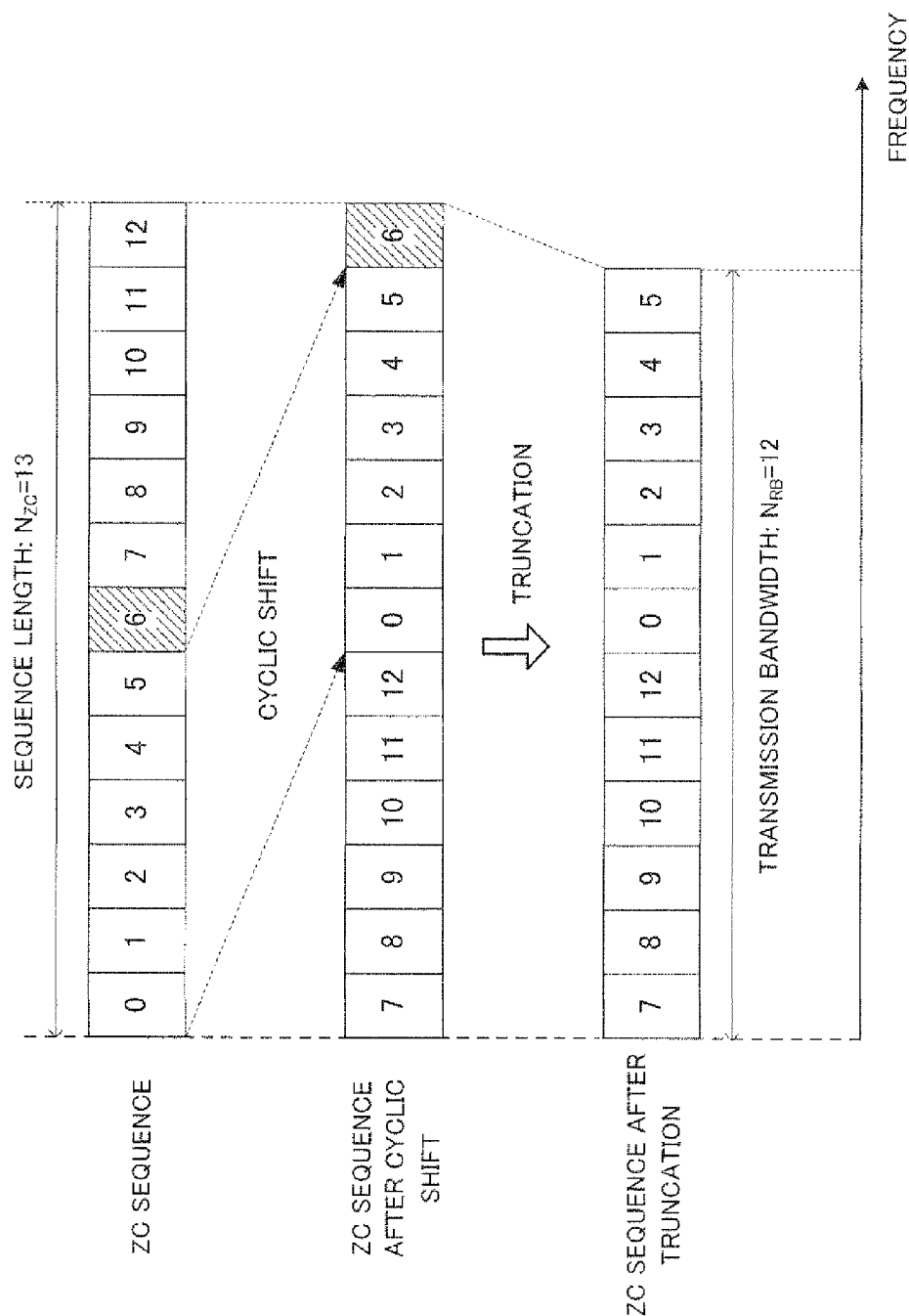
FIG. 16 is a diagram illustrating truncation processing according to embodiment 2 of the present invention.

First, as shown in FIG. 16, of a plurality of symbols constituting the ZC sequence, subcarrier cyclic shift section 301 specifies the symbol of the symbol number n=6 located in the center of the ZC sequence as a symbol to be truncated by sequence length adjusting section 302 in the same manner as sequence length adjusting section 103 of radio communication apparatus 100 in the transmitting side of embodiment 1 (FIG. 4).

Next, subcarrier cyclic shift section 301 cyclically shifts a symbol to be truncated to the end of the ZC sequence. To be more specific, subcarrier cyclic shift section 301 cyclically shifts the symbol of the symbol number n=6 so as to be located at the tail end of the ZC sequence as shown in FIG. 16. That is, subcarrier cyclic shift section 301 cyclically shifts 13 symbols (symbol numbers n=0 to 12) constituting the ZC sequence by six symbols in ascending order. By this means, subcarrier cyclic shift section 301 obtains a ZC sequence of 13 symbols of the symbol numbers n=7 to 12, n=0 to 6 in that order as shown in FIG. 16.

Then, in the sequence length adjusting section 302, the symbol of the symbol number n=6 located at the tail end of the ZC sequence is truncated. As a result of this, the ZC sequence after truncation becomes a ZC sequence of 12 symbols of the symbol numbers n=7 to 12 and n=0 to 5 in that order as shown in FIG. 16.

Here, in the ZC sequence, the symbol of the minimum symbol number (n=0 in FIG. 16) and the symbol of the maximum symbol number (n=12 in FIG. 16) continue. That is, symbols of the ZC sequence after truncation are continued from the first to last symbols in sequence length adjusting section 302, and therefore there is no discontinuous point.

As described above, since there is no discontinuous point in symbols constituting a ZC sequence even when the ZC sequence is truncated, it is possible to minimize CM caused by truncation.

Next, a case in which a ZC sequence is extended will be described. Here, sequence length $N_{ZC}$ is 11 and the number of subcarriers $N_{RB}$ corresponding to the transmission bandwidth of RS is 12 as with the case of adjustment example 2 of embodiment 1 That is, sequence length adjusting section 103 extends one symbol.

Figure 17:
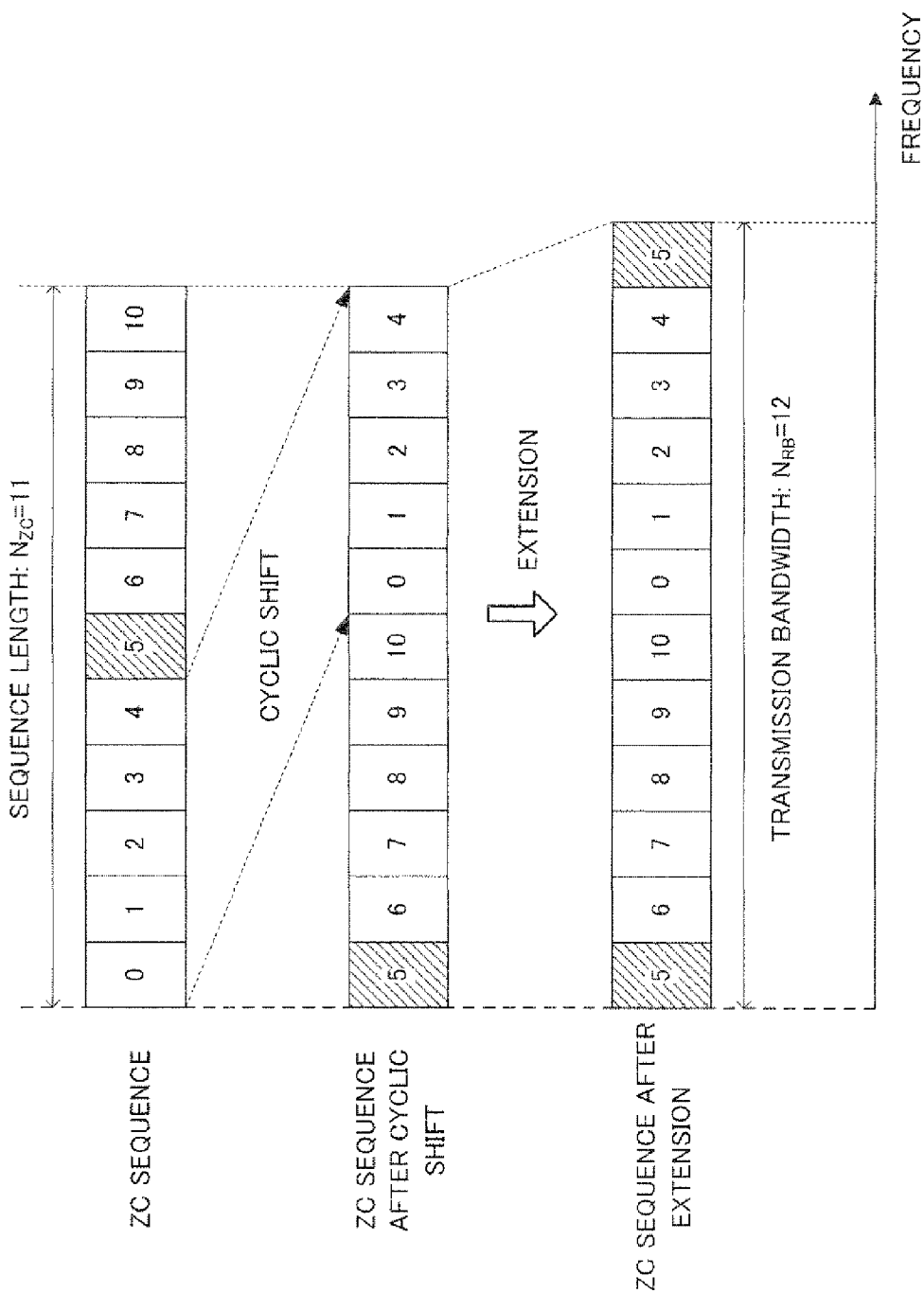
FIG. 17 is a diagram illustrating extension processing according to embodiment 2 of the present invention.

First, as shown in FIG. 17, of a plurality of symbols constituting the ZC sequence, subcarrier cyclic shift section 301 specifies a symbol of the symbol number n=5 located in the center of the ZC sequence as a symbol to be extended by sequence length adjusting section 302 in the same manner as sequence length adjusting section 103 of radio communication apparatus 100 in the transmitting side of embodiment 1 (FIG. 4).

Next, subcarrier cyclic shift section 301 cyclically shifts the symbol to be extended to the end of the ZC sequence. To be more specific, subcarrier cyclic shift section 301 cyclically shifts the symbol of the symbol number n=5 to the beginning of the ZC sequence as shown in FIG. 17. That is, subcarrier cyclic shift section 301 cyclically shifts 11 symbols (symbol numbers n=0 to 10) constituting the ZC sequence by six symbols in ascending order. In this way, subcarrier cyclic shift section 301 can obtain a ZC sequence of 11 symbols made up of the symbol numbers n=5 to 10, n=0 to 4 in that order as shown in FIG. 17.

Sequence length adjusting section 302 then extends the symbol of the symbol number n=5 located at the beginning of the ZC sequence. The symbol of the symbol number n=5 newly generated by extension is placed at the tail end of the ZC sequence. Therefore, the ZC sequence after extension becomes a ZC sequence of 12 symbols made up of the symbol numbers n=5 to 10 and n=0 to 5 in that order as shown in FIG. 17.

Thus, symbols of the ZC sequence after extension are continued from the first to last symbols, and therefore there is no discontinuous point as in the above described case where the ZC sequence is truncated. Thus, there is no discontinuous point in symbols constituting the ZC sequence even when the ZC sequence is extended, and it is thereby possible to suppress CM to a minimum.

Figure 18:
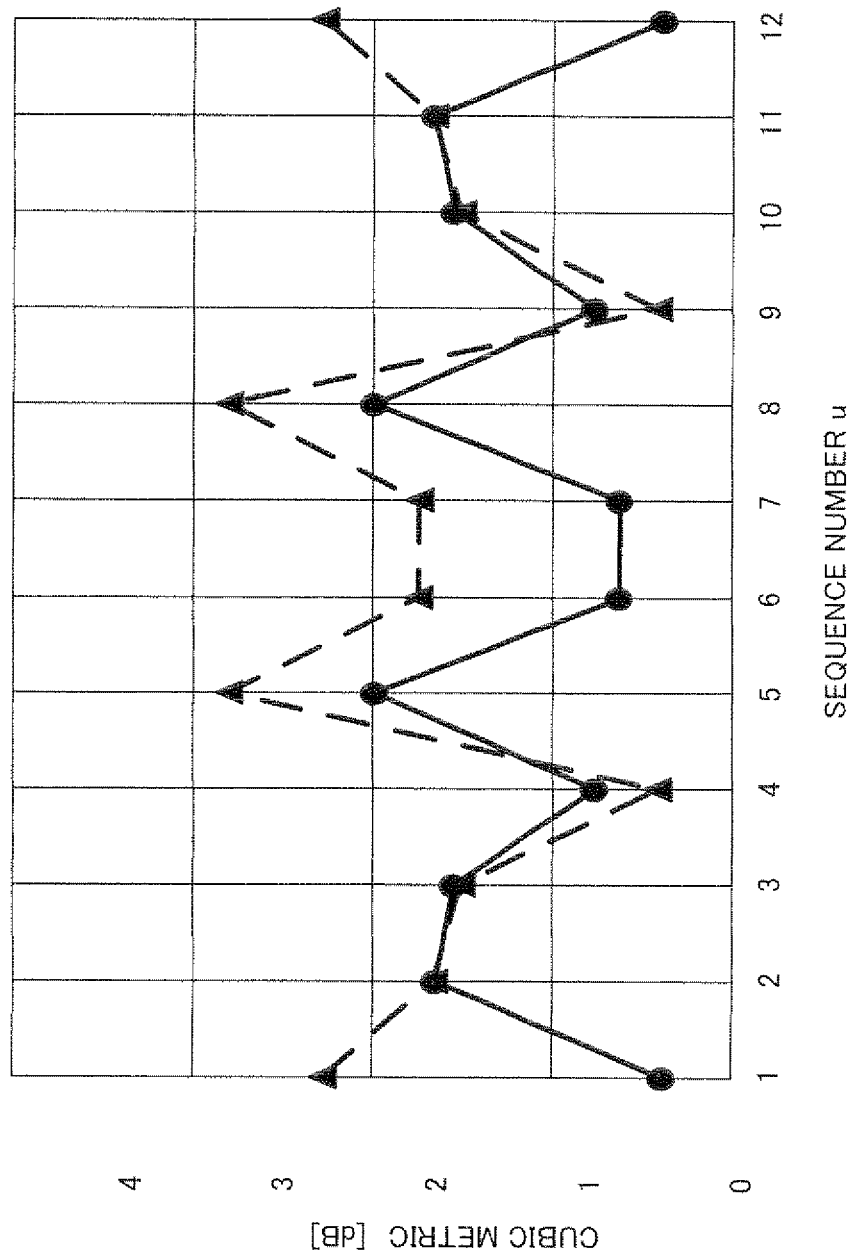
FIG. 18 is a diagram illustrating a CM characteristic according to embodiment 2 of the present invention.

FIG. 18 shows a comparison of CM characteristics according to the presence/absence of subcarrier cyclic shift processing obtained through computer simulation by the present inventors. In FIG. 18, the horizontal axis shows sequence number u and the vertical axis shows CM. It is observed from FIG. 18 that CM (solid line) with subcarrier cyclic shift processing is reduced more than CM (dotted line) with no subcarrier cyclic shift processing.

Figure 19:
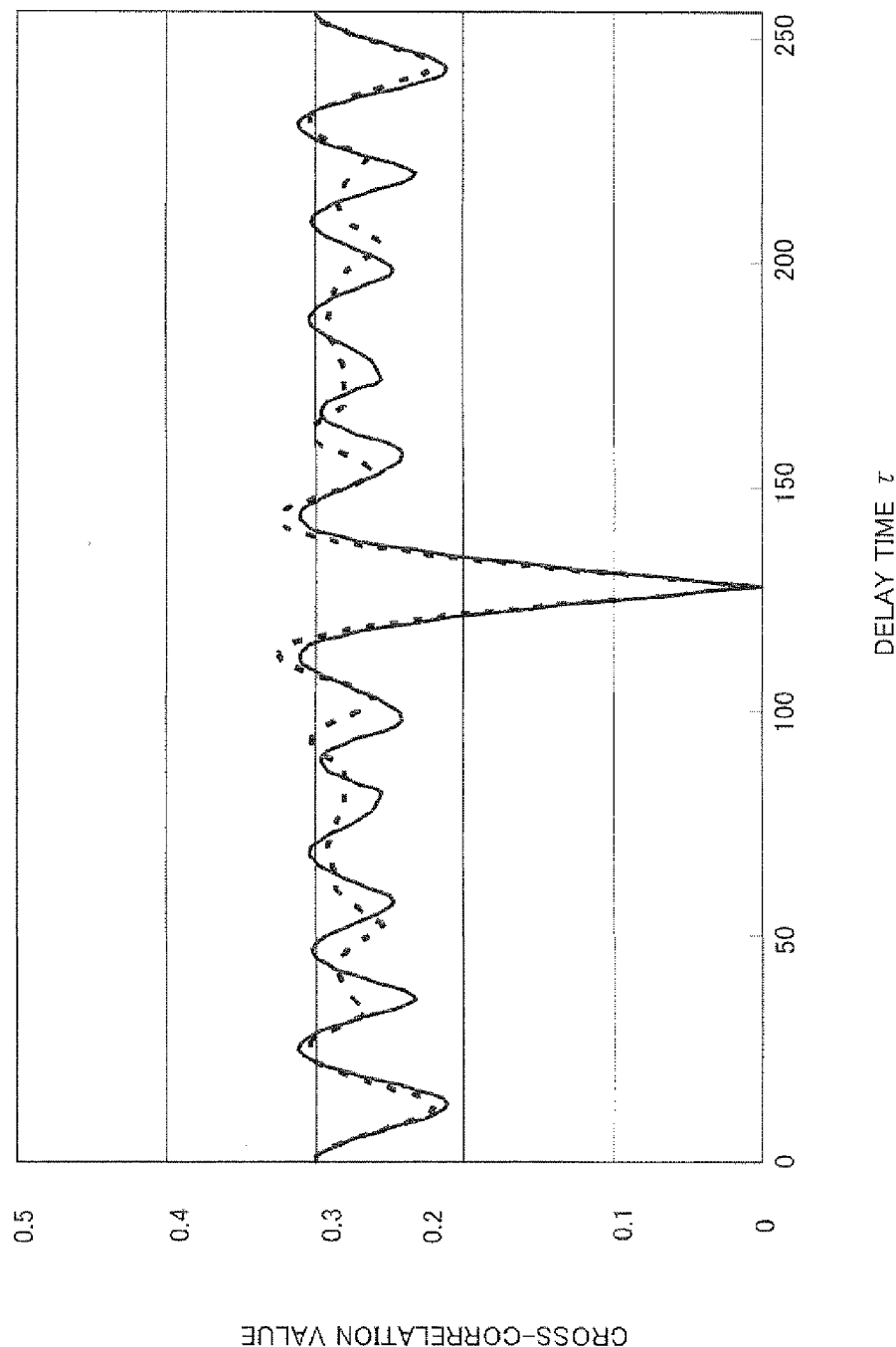
FIG. 19 is a diagram illustrating a cross-correlation characteristic among CS-ZC sequences according to embodiment 2 of the present invention.

On the other hand, FIG. 19 shows cross-correlation characteristics between ZC sequences of different sequence numbers obtained through computer simulation by the present inventors. In FIG. 19, the horizontal axis shows delay time $\tau$ of reception timing and the vertical axis shows an average value of cross-correlation values by all combinations of sequence numbers of the ZC sequences. As shown in FIG. 19, it is observed that there is no difference between the cross-correlation characteristic (solid line) of the ZC sequence with subcarrier cyclic shift processing and the cross-correlation characteristic (dotted line) of the ZC sequence with no subcarrier cyclic shift processing and neither of the cross-correlation characteristics has any cross-correlation peak.

That is, sequence length adjusting section 302 cyclically shifts symbols to be truncated or extended in the ZC sequence to the end of the ZC sequence, and can thereby suppress CM to a minimum while obtaining the effect of preventing degradation of the BLER performance as in the case of Embodiment 1.

Furthermore, ZC sequence generation section 207 of radio communication apparatus 200 in the receiving side (FIG. 5) cyclically shifts a plurality of symbols constituting the ZC sequence in the frequency domain as in the case of subcarrier cyclic shift section 301. Furthermore, ZC sequence generation section 207 truncates or extends a symbol located at the end of the ZC sequence as in the case of sequence length adjusting section 302.

By this means, according to the present embodiment, there will be no discontinuous points among sequence numbers in the ZC sequence after truncation or ZC sequences after extension. Thus, according to the present embodiment, it is possible to further reduce CM compared to adjustment example 4 and adjustment example 6 of Embodiment 1 while obtaining an effect similar to that of Embodiment 1, and suppress CM to a minimum. Reducing CM in this way makes it possible to efficiently use, for example, a radio amplifier of the radio communication apparatus in the transmitting side and thereby expand communication coverage.

Figure 20:
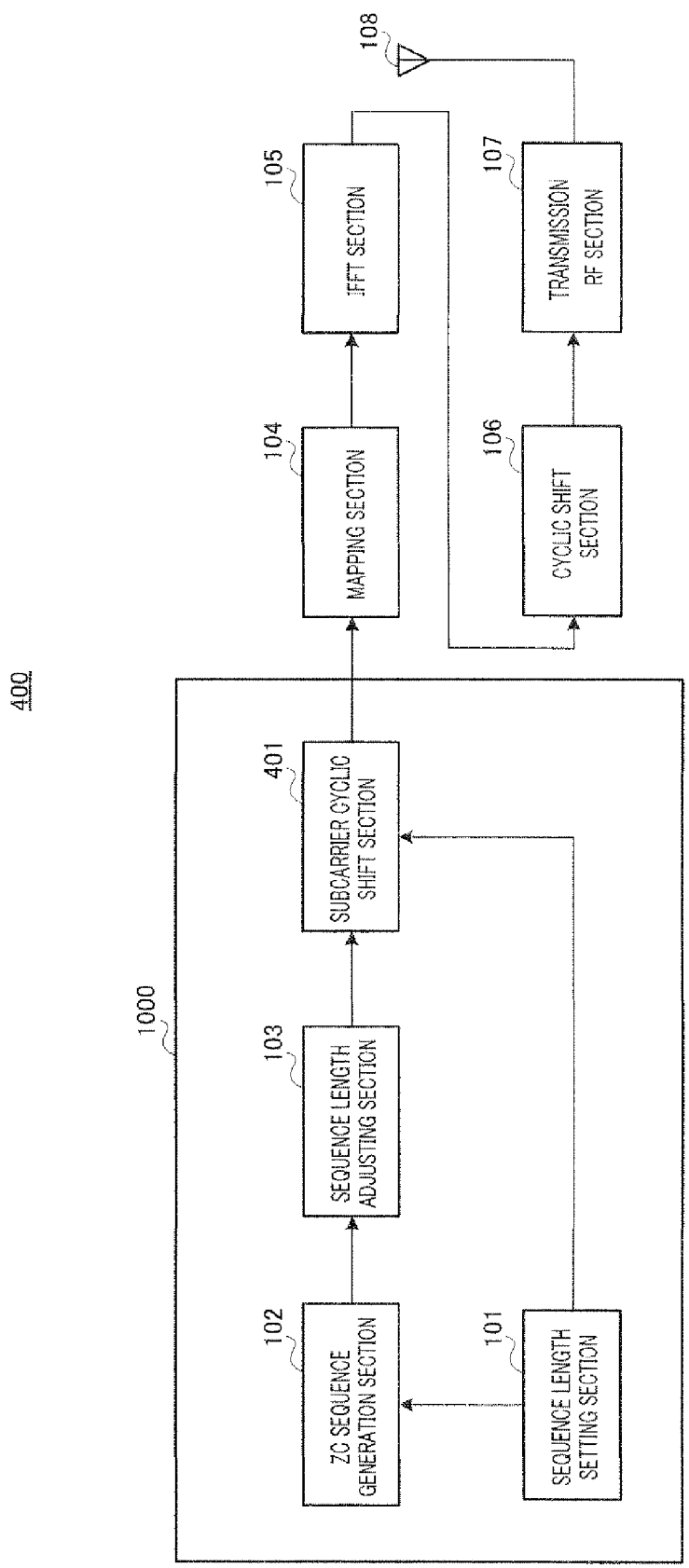
FIG. 20 is a block diagram illustrating a configuration of another radio communication apparatus in the transmitting side according to embodiment 2 of the present invention.
Figure 21:
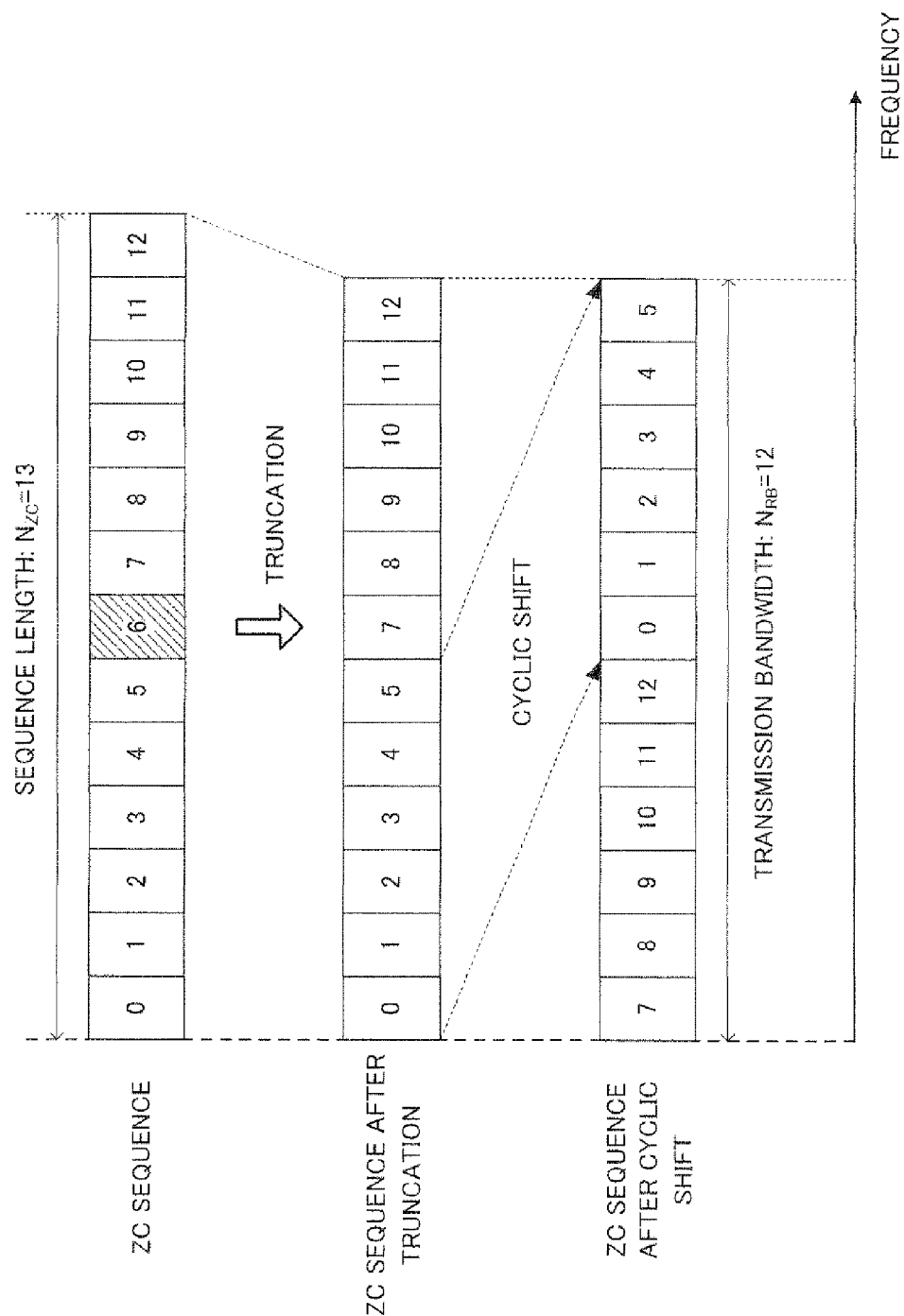
FIG. 21 is a diagram illustrating another truncation processing according to embodiment 2 of the present invention.
Figure 22:
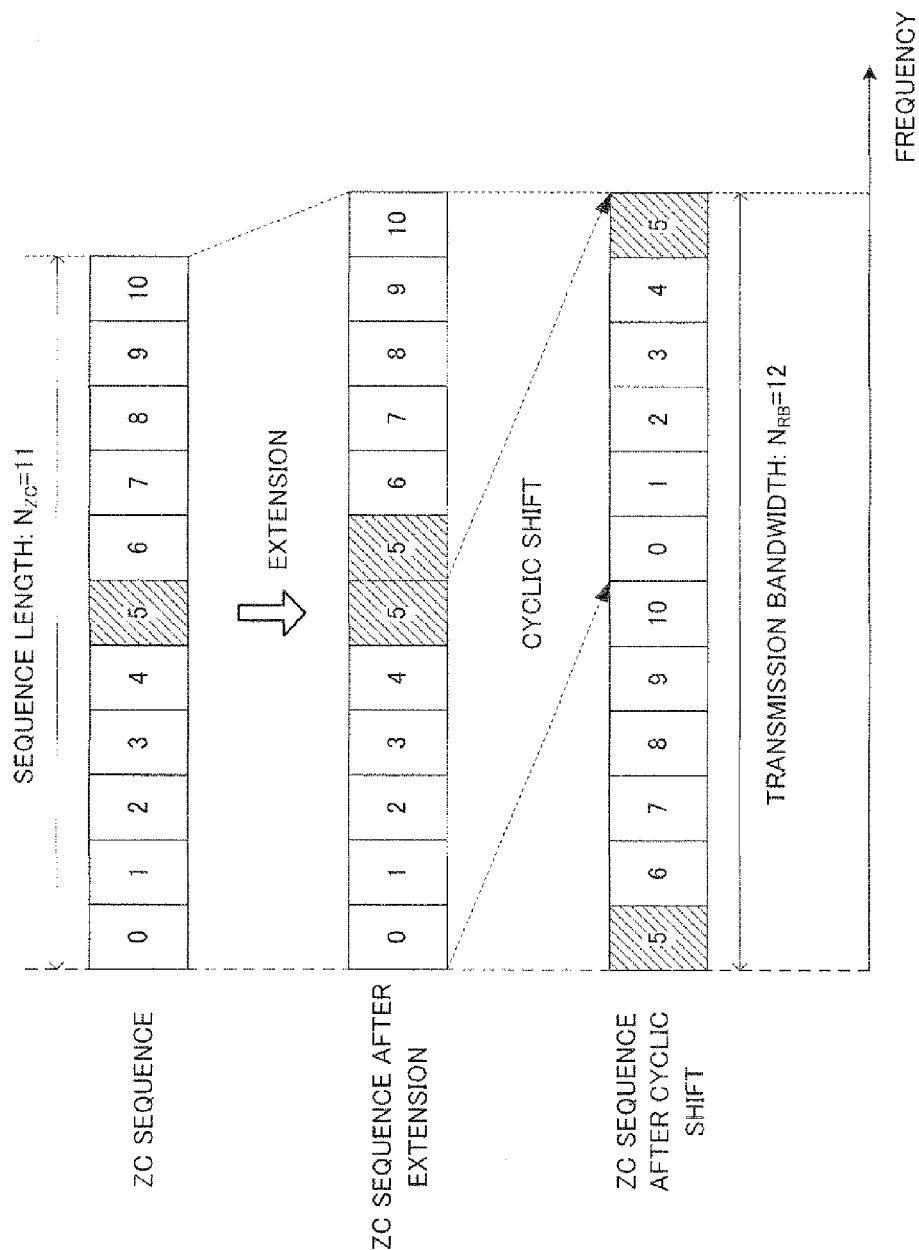
FIG. 22 is a diagram illustrating another extension processing according to embodiment 2 of the present invention.

A case has been described in the present embodiment where a plurality of symbols constituting the ZC sequence are cyclically shifted in the frequency domain and then truncated or extended. However, in the present embodiment, as shown in FIG. 20, subcarrier cyclic shift section 401 of radio communication apparatus 400 in the transmitting side may cyclically shift the ZC sequence truncated or extended by sequence length adjusting section 103 in the frequency domain. In this case, in the ZC sequence after truncation, as shown in FIG. 21, there is a discontinuous point between the symbols of the symbol numbers n=5 and n=7 (between two symbols of the symbol number n=5 in the ZC sequence after extension as shown in FIG. 22).

Thus, subcarrier cyclic shift section 401 cyclically shifts symbols so that the symbol located before the discontinuous point is located at the tail end of the ZC sequence, that is, the symbol located after the discontinuous point is located at the beginning of the ZC sequence. To be more specific, as shown in FIG. 21 (FIG. 22), subcarrier cyclic shift section 401 cyclically shifts symbols of the ZC sequence in ascending order by six symbols. Thus, in subcarrier cyclic shift section 401, the symbols between which a discontinuous point exists are apart from one another at the beginning and tail end of the ZC sequence. This eliminates any discontinuous points from the entire ZC sequence. Therefore, there are no discontinuous points in the truncated or extended ZC sequence, so that it is possible to obtain an effect similar to that of the present embodiment.

Embodiment 3

With the present embodiment, parameters of a ZC sequence is set such that a symbol to be truncated or extended is located at an end of the ZC sequence.

Now, the present embodiment will be described more specifically.

Figure 23:
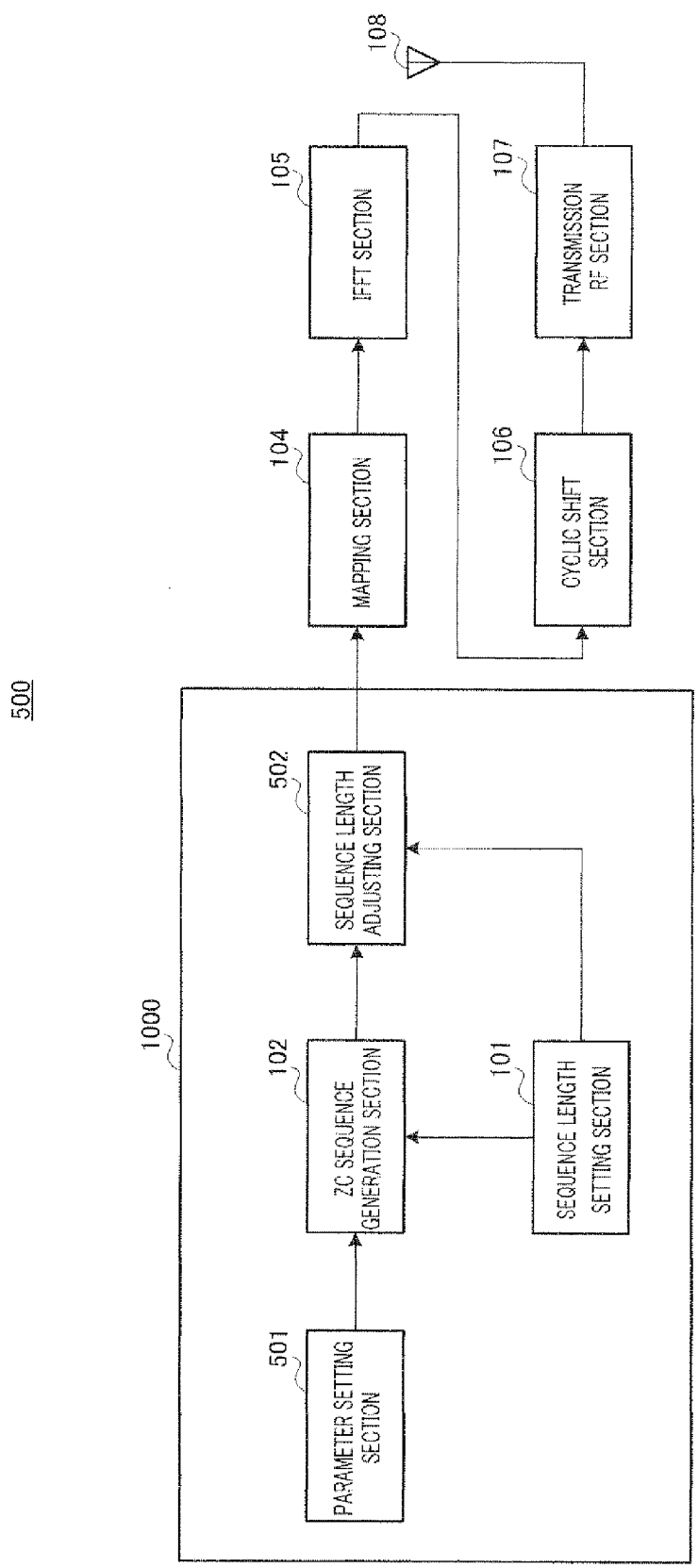
FIG. 23 is a block diagram illustrating a configuration of a radio communication apparatus in the transmitting side according to embodiment 3 of the present invention.

FIG. 23 is a block diagram illustrating a configuration of radio communication apparatus 500 in the transmitting side according to the present embodiment.

In radio communication apparatus 500 in the transmitting side shown in FIG. 23, parameter setting section 501 sets parameters of a ZC sequence such that a symbol to be truncated or extended by sequence length adjusting section 502 is located at an end of the ZC sequence. To be more specific, in the ZC sequence shown in equation 1, parameter setting section 501 sets q to a value shown in the following equation. Here, parameter setting section 501 sets the value of q such that the symbol to be truncated is located at the tail end of the ZC sequence and also sets the value of q such that the symbol to be extended is located at the beginning of the ZC sequence.

$$q = N_{ZC} - (N_{RB}/2) \quad \text{(Equation 3)}$$

Sequence length adjusting section 502 truncates the symbol at the tail end of the ZC sequence when truncating the ZC sequence, and extends the symbol at the beginning of the ZC sequence in the tail end of the ZC sequence when extending the ZC sequence.

Next, processing of setting q in parameter setting section 501 will be described more specifically.

Here, sequence length $N_{ZC}$ is 13 and the number of subcarriers $N_{RB}$ corresponding to the transmission bandwidth of RS is 12. Therefore, parameter setting section 501 sets the value of q of the ZC sequence shown in equation 1 to 7 according to equation 3.

Figure 24:
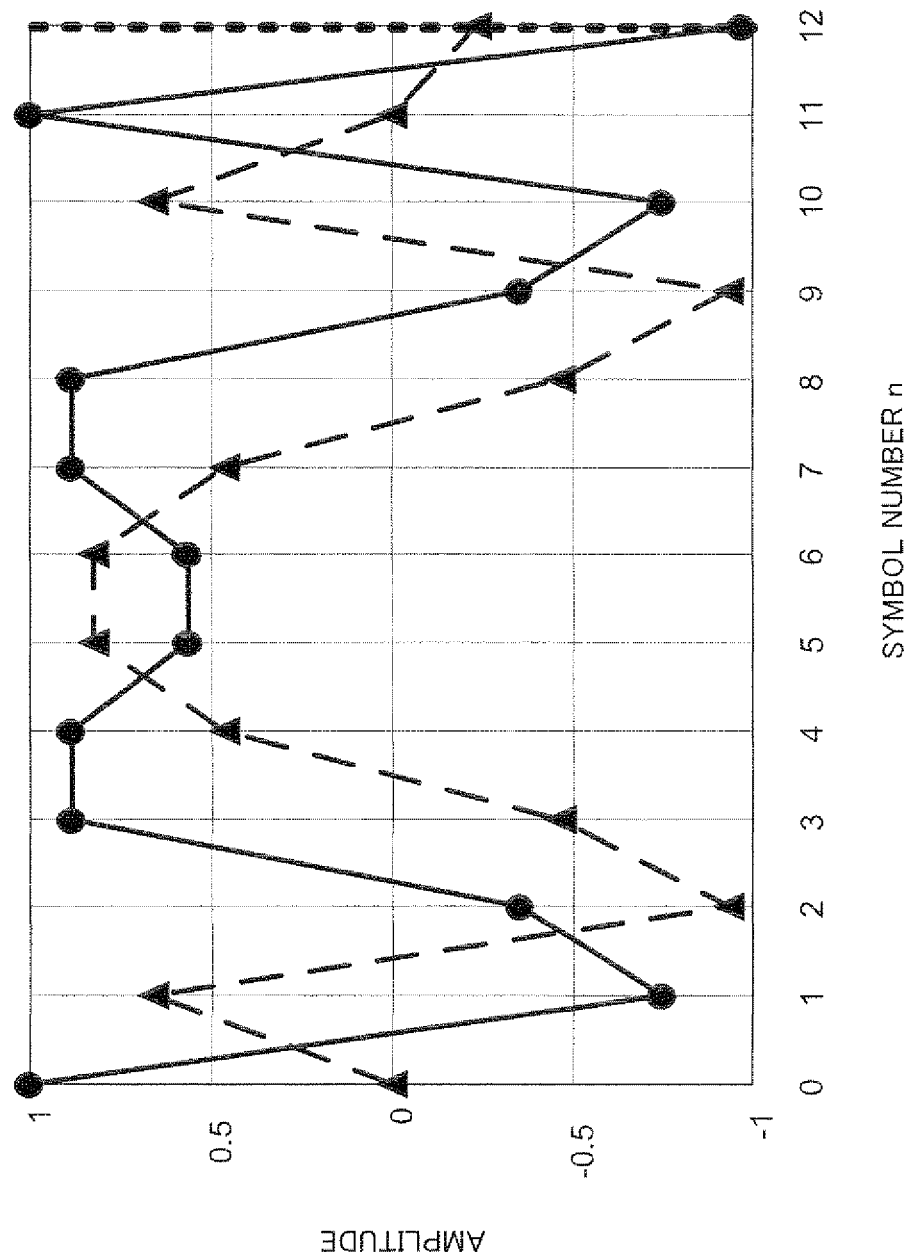
FIG. 24 is a diagram illustrating a waveform of a ZC sequence according to embodiment 3 of the present invention (where q=7)

FIG. 24 shows a waveform of the ZC sequence with q=7. As shown in FIG. 24, of 13 symbols of the symbol numbers n=0 to 12 of the ZC sequence, symbols of the symbol numbers n=0 to 5 and symbols of the symbol numbers n=11 to 6 have a symmetrical relationship respectively centered around the midpoint between the symbol numbers n=5 and n=6. On the other hand, the symbol of the symbol number n=12 located at the tail end of the ZC sequence has no symmetrical relationship with any other symbols.

That is, the symbol of the symbol number n=12 shown in FIG. 24 is equivalent to the symbol of the symbol number n=6 of the waveform of the ZC sequence shown in FIG. 3 described in embodiment 1, that is, the symbol located in the center of the ZC sequence. That is, in the present embodiment, parameter setting section 501 sets the value of q according to equation 3, and therefore a waveform in which the symbol located in the center of the ZC sequence with q=0 is moved to the tail end of the ZC sequence can be obtained.

By this means, even when sequence length adjusting section 502 truncates the symbol located at the tail end of the ZC sequence, it is possible to maintain the symmetry of the ZC sequence after truncation and also maintain continuity of symbols. To be more specific, sequence length adjusting section 502 generates a ZC sequence of 12 symbols of the symbol numbers n=0 to 12 except the symbol of the symbol number n=12 in the ZC sequence shown in FIG. 24. This ZC sequence of 12 symbols is composed of even-symmetrical symbols centered around the midpoint between the symbols of the symbol numbers n=5 and n=6 and is composed of symbols of serial symbol numbers n=0 to 11.

Next, a case in which symbols of a ZC sequence are extended will be described. Here, sequence length $N_{ZC}$ is 11 and the number of subcarriers $N_{RB}$ corresponding to the transmission bandwidth of RS is 12. Therefore, parameter setting section 501 sets the value of q of the ZC sequence expressed by equation 1 to 5 according to equation 3.

Figure 25:
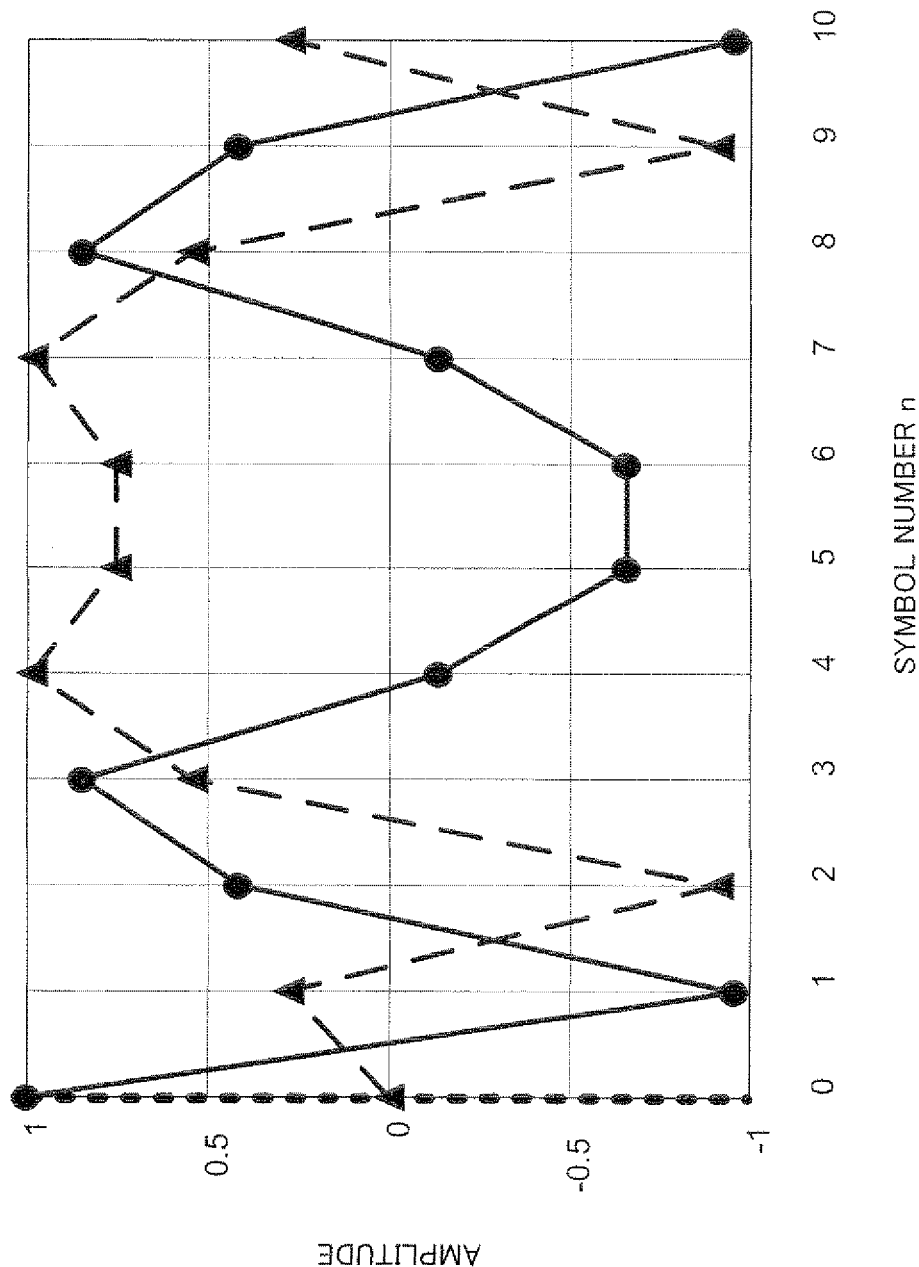
FIG. 25 is a diagram illustrating a waveform of a ZC sequence according to embodiment 3 of the present invention (where q=5)

FIG. 25 shows a waveform of the ZC sequence with q=5. As shown in FIG. 25, of 11 symbols of the symbol numbers n=0 to 10 of the ZC sequence, symbols of the symbol numbers n=1 to 5 and symbols of the symbol numbers n=10 to 6 have a symmetrical relationship respectively centered around the midpoint between symbol numbers n=5 and n=6. On the other hand, the symbol of the symbol number n=0 located at the beginning of the ZC sequence has no symmetrical relationship with any other symbols.

That is, in the same manner as the case in truncation, parameter setting section 501 sets the value of q according to equation 3, and therefore a waveform in which the symbol located in the center of the ZC sequence is moved to the beginning of the ZC sequence can be obtained.

By this means, even when sequence length adjusting section 502 extends the symbol located at the beginning of the ZC sequence, it is possible to maintain the symmetry of the ZC sequence after extension and also maintain continuity of symbols. To be more specific, in sequence length adjusting section 502, a ZC sequence of 12 symbols of the symbol numbers n=0 to 11 and n=0 in which the symbol of the symbol number n=0 is extended next to the symbol of the symbol number n=10 in the ZC sequence shown in FIG. 25 is generated. This ZC sequence of 12 symbols is composed of even-symmetrical symbols centered around the midpoint between the symbols of the symbol numbers n=5 and n=6 and is composed of symbols of serial symbol numbers n=0 to 10 and n=0 in that order.

As described above, parameter setting section 501 can place the symbol to be truncated or extended at the end of the ZC sequence by setting q of the ZC sequence shown in equation 1. That is, parameter setting section 501 can perform processing equivalent to that of subcarrier cyclic shift section 301 (FIG. 15) of radio communication apparatus 300 in the transmitting side according to embodiment 2.

Moreover, ZC sequence generation section 207 (FIG. 5) of radio communication apparatus 200 in the receiving side sets parameters of a ZC sequence to generate a ZC sequence in the same manner as parameter setting section 501, and truncates or extends a symbol located at the end of the ZC sequence in the same manner as sequence length adjusting section 502.

As described above, according to the present embodiment, parameters of the ZC sequence are set such that the symbol to be truncated or extended is placed at the end of the ZC sequence. By this means, the radio communication apparatus in the transmitting side can perform truncation or extension while maintaining symmetry of the ZC sequence and continuity of symbols, and therefore can obtain an effect similar to that of embodiment 2.

The embodiments of the present invention have been described so far.

Although a case has been explained in the above described embodiments where a ZC sequence in the frequency domain is used, the present invention is not limited to this, but a ZC sequence generated in the time domain may also be used. However, the ZC sequence in the time domain and the ZC sequence in the frequency domain have a relationship as shown in the following equation.

$$(u \times r) \bmod(N_{ZC}) = N_{ZC} - 1 \quad \text{(Equation 4)}$$

In equation 4, $N_{ZC}$ denotes the sequence length of the ZC sequence and r denotes the sequence number of the ZC sequence in the time domain. The ZC sequence in the time domain and the ZC sequence in the frequency domain have similar nature, and therefore it is possible to obtain an effect similar to that of the above described embodiments.

Figure 26:
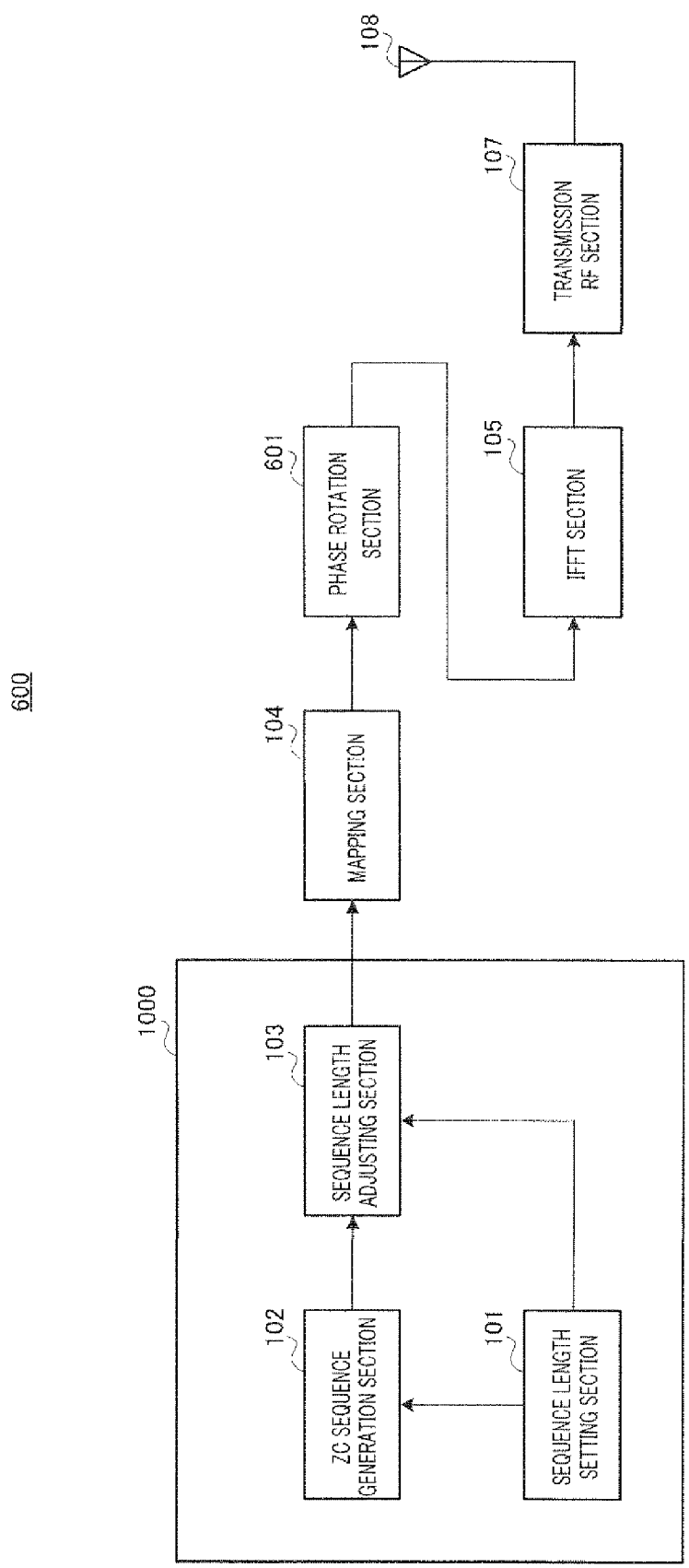
FIG. 26 is a block diagram illustrating a configuration of a radio communication apparatus in the transmitting side of the present invention (when a phase rotation section is used)

In the above described embodiments, phase rotation processing in the frequency domain may be performed in phase rotation section 601 shown in FIG. 26 instead of cyclic shift processing in the time domain in cyclic shift section 106 shown in FIG. 4.

Moreover, a case has been explained in the above described embodiments where the ZC sequence is used by being cyclically shifted, but the present invention is also applicable to a case where no cyclic shift is performed. When no cyclic shift is performed, cyclic shift section 106 (FIG. 4) of radio communication apparatus 100 in the transmitting side and mask processing section 210 (FIG. 5) of radio communication apparatus 200 in the receiving side are unnecessary.

Furthermore, a case has been explained in the above described embodiments where frequency domain equalization section 214 of radio communication apparatus 200 (FIG. 5) in the receiving side performs data signal equalization processing in the frequency domain. However, the present invention may also perform data signal equalization processing in the time domain.

Furthermore, a case with an SC-FDMA (Single Carrier-Frequency Division Multiplexing Access) configuration has been explained in the above described embodiments, but the present invention may also adopt an OFDM (Orthogonal Frequency Division Multiplexing) configuration.

Furthermore, a case has been explained in the above described embodiments as an example where a ZC sequence is used as a reference signal for channel estimation. However, the present invention is not limited to this, and a ZC sequence may be used, for example, as a reference signal for channel quality estimation (Sounding RS) and synchronization channel, and as a preamble signal of random access and a CQI signal or an ACK/NACK signal. Furthermore, a ZC sequence may also be used as a spreading code.

Furthermore, although a case has been explained in the above described embodiments where a ZC sequence is used as a reference signal from the mobile station to the base station, the present invention is not limited to this, but the present invention is likewise applicable to a case where a ZC sequence is used as a reference signal from the base station to the mobile station.

Furthermore, a case has been explained in the above described embodiments as an example where a ZC sequence is used as a reference signal, but other sequences including a ZC sequence, for example, a GCL sequence $c_i(n)$ shown in equation 5 below may be used as a reference signal.

$$c_i(n) = x_u(n) b_i(n \bmod m), n = 0, 1, \ldots, N_{GCL} - 1, i = 0, 1, \ldots, m-1 \quad \text{(Equation 5)}$$

In equation 5, $N_{GCL}$ denotes a sequence length of the GCL sequence and $N_{GCL} = sm^2$ (s and m are integers) or $N_{GCL} = tm$ (t and m are integers). Moreover, $x_u(n)$ denotes the ZC sequence expressed by equation 1 or equation 2, and a DFT sequence expressed by equation 6 or an Hadamard sequence expressed by equation 7 is used for $b_i(k)$ (k=0, . . . , m).

(Equation 6)

$$b_i(k) = W_m^{ik}, \quad [4]$$
$$i, k = 0, 1, \ldots, m-1$$

(Equation 7)

$$b_i(k) = (-1)^l, l = \sum_{j=0}^{m-1} i_j \cdot k_j, \quad [5]$$
$$i, k = 0, 1, \ldots, m-1$$

Furthermore, although the above described embodiments have been explained using a ZC sequence, the ZC sequence is not limited to the sequences expressed by the respective equations, but the ZC sequence also includes a sequence generated by repeating a part of the ZC sequence and a sequence generated by truncating a part of the ZC sequence or extracting a part of the ZC sequence.

Furthermore, in the above described embodiments, u shown in equation 1 and equation 2 is referred to as a sequence number, but u may also be referred to as an input number, subcarrier number, sample number, chip number and so forth.

Figure 27:
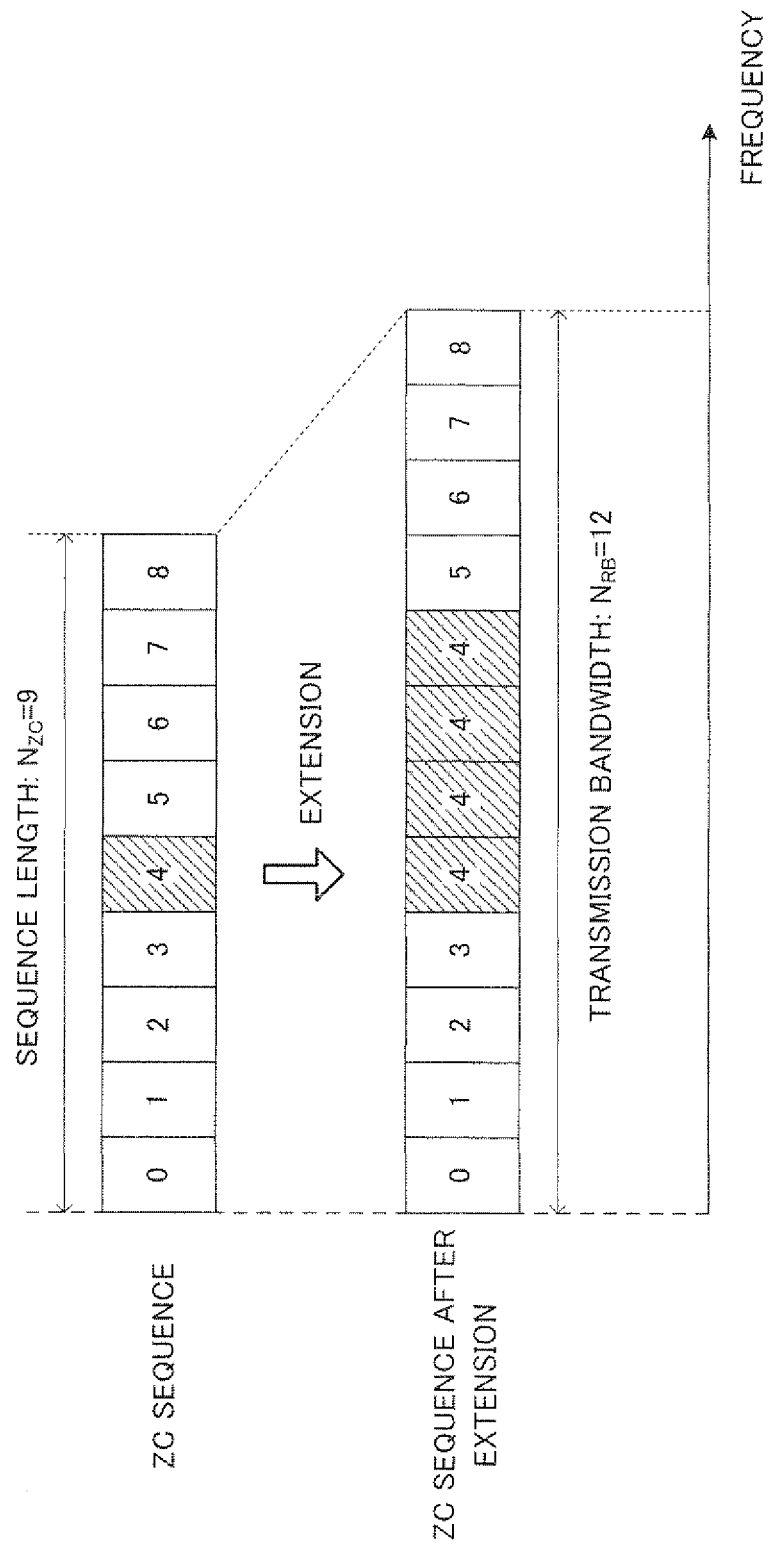
FIG. 27 is a diagram illustrating another sequence length adjusting method.

Furthermore, the present invention may also perform extension by making a plurality of copies of only a symbol located in the center of the ZC sequence. For example, as shown in FIG. 27, when the ZC sequence of sequence length $N_{ZC}=9$ is extended to a ZC sequence of $N_{RB}=12$, the radio communication apparatus in the transmitting side may make three copies of the symbol of the symbol number n=4 located in the center, among the respective symbols of the ZC sequence (symbol numbers n=0 to 8). By this means, as shown in FIG. 27, a ZC sequence of 12 symbols composed of the symbol numbers n=0 to 3, 4, 4, 4, 4, 5 to 8 in that order is obtained. Since the four symbols of the symbol number n=4 obtained by extension have the same amplitude, symmetry of the entire ZC sequence is maintained. Therefore, an effect similar to that of the above described embodiment can be obtained.

Figure 28:
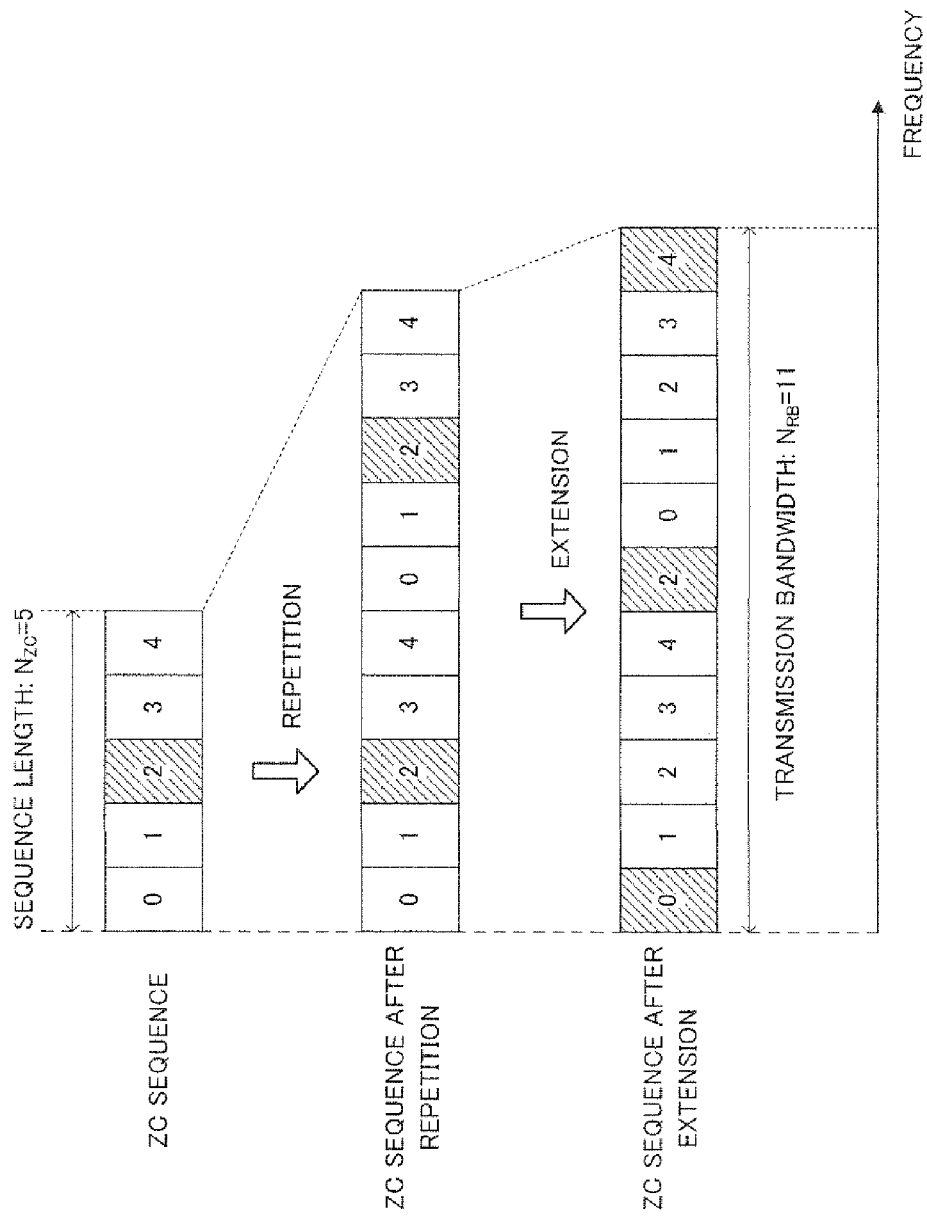
FIG. 28 is a diagram illustrating another sequence length adjusting method.

Moreover, the present invention may perform truncation or extension on a sequence generated by replicating (repetition) a ZC sequence. For example, as shown in FIG. 28, when a sequence of 10 symbols obtained by repeating the ZC sequence of sequence length $N_{ZC}=5$ is extended to a ZC sequence of sequence length $N_{RB}=11$, the radio communication apparatus in the transmitting side performs extension while maintaining symmetry of the sequence obtained by repetition. To be more specific, the radio communication apparatus in the transmitting side extends the symbol of the symbol number n=2 located in the center of the ZC sequence in the center of the sequence obtained by repetition. That is, a symbol of the symbol number n=2 is extended between symbol numbers n=4 and n=0 in the vicinity of the center of the sequence shown in the middle of FIG. 28. This allows the ZC sequence of sequence length $N_{RB}=11$ to maintain symmetry and obtain an effect similar to that of the above described embodiments.

Furthermore, the scope of application of the present invention may be limited. For example, the present invention may be applied to only a ZC sequence whose sequence length is smaller than a threshold (having a small transmission bandwidth of RS) and the present invention may not be applied to a ZC sequence whose sequence length is greater than the threshold (having a large transmission bandwidth of RS). The greater the sequence length of the ZC sequence (the greater the transmission bandwidth of RS) is, the smaller the influence of truncation or extension on the cross-correlation characteristic is. Therefore, applying the present invention only to the ZC sequence whose sequence length is smaller than a threshold (having a small transmission bandwidth of RS) makes it possible to more efficiently obtain the effect of preventing degradation of the BLER performance by truncation or extension. With the ZC sequence whose sequence length is larger than a threshold (having a large transmission bandwidth of RS), processing to specify symbols to be truncated or extended may be omitted.

Moreover, although cases have been described with the embodiments above where the present invention is configured by hardware, the present invention may be implemented by software.

Each function block employed in the description of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-255414, filed on Sep. 28, 2007, including the specification, drawings and abstract, is incorporated herein by reference in its entirety.

INDUSTRIAL APPLICABILITY

The present invention is applicable to a mobile communication system and so forth.

The invention claimed is:

1. A radio communication apparatus comprising:
an adjuster configured to specify each location of one or more symbols to be extended among a plurality of symbols comprising a generalized chirp-like sequence according to a number of the one or more symbols to be extended and adjust a sequence length of the generalized chirp-like sequence by extending the determined one or more symbols; and
a transmitter configured to transmit the adjusted generalized chirp-like sequence,
wherein when the number of symbols to be extended is one, the adjuster extends the symbol located in a center, among the plurality of symbols, and a symbol newly generated by extending the symbol located in the center is located at a position neighboring the extended symbol in the adjusted generalized chirp-like sequence.

2. The radio communication apparatus according to claim 1, wherein when the number of symbols to be extended is odd-numbered and greater than one, the adjuster extends a symbol located in a center and symbols located at even intervals before and after the symbol located in the center, among the plurality of symbols.

3. The radio communication apparatus according to claim 1, wherein when the number of symbols to be extended is odd-numbered, the adjuster extends the symbol located in a center and continuous symbols neighboring both sides of the symbol located in the center, among the plurality of symbols.

4. The radio communication apparatus according to claim 1, further comprising a shifter configured to shift the generalized chirp-like sequence such that the one or more symbols to be extended by the adjuster is located to an end of the generalized chirp-like sequence.

5. A radio communication apparatus comprising:
an adjuster configured to specify each location of one or more symbols to be extended among a plurality of symbols comprising a generalized chirp-like sequence according to a number of the one or more symbols to be extended and adjust a sequence length of the generalized chirp-like sequence by extending the determined one or more symbols; and
a transmitter configured to transmit the adjusted generalized chirp-like sequence,
wherein when the number of symbols to be extended is even-numbered, the adjuster extends symbols located at even intervals before and after the symbol located in the center, among the plurality of symbols.

6. A radio communication apparatus comprising:
an adjuster configured to specify each location of one or more symbols to be extended among a plurality of symbols comprising a generalized chirp-like sequence according to a number of the one or more symbols to be extended and adjust a sequence length of the generalized chirp-like sequence by extending the determined one or more symbols;
a transmitter configured to transmit the adjusted generalized chirp-like sequence; and
a setting section configured to set parameters of the generalized chirp-like sequence such that the one or more symbols to be extended by the adjuster is located at an end of the generalized chirp-like sequence.

7. The radio communication apparatus according to claim 6, wherein the setting section sets q in a zadoff-chu sequence shown in equation 1, which is a kind of the generalized chirp-like sequence, to $N_{ZC}-N_{rb}/2$ (where $N_{ZC}$ is the sequence length, $N_{rb}$ is a number of subcarriers corresponding to a transmission bandwidth of a reference signal):

(Equation 1)
$$x_u(n) = e^{-j\frac{\pi u\{n(n+1)+qn\}}{N_{ZC}}},$$
$$0 \le n \le N_{ZC} - 1$$

8. A sequence length adjusting method comprising:
specifying, by an adjuster, each location of one or more symbols to be extended among a plurality of symbols comprising a generalized chirp-like sequence according to a number of the one or more symbols to be extended;
adjusting, by the adjuster, a sequence length of the generalized chirp-like sequence by extending the determined one or more symbols; and
transmitting, by a transmitter, the adjusted generalized chirp-like sequence, wherein when the number of symbols to be extended is one, extending, by the adjuster, the symbol located in a center, among the plurality of symbols, a symbol newly generated by extending the symbol located in a center being located at a position neighboring the extended symbol in the adjusted generalized chirp-like sequence.

* * * * *